Sept. 25, 1962    F. S. WIEDMER ETAL    3,055,587
ARITHMETIC SYSTEM
Filed Nov. 3, 1959    9 Sheets-Sheet 1
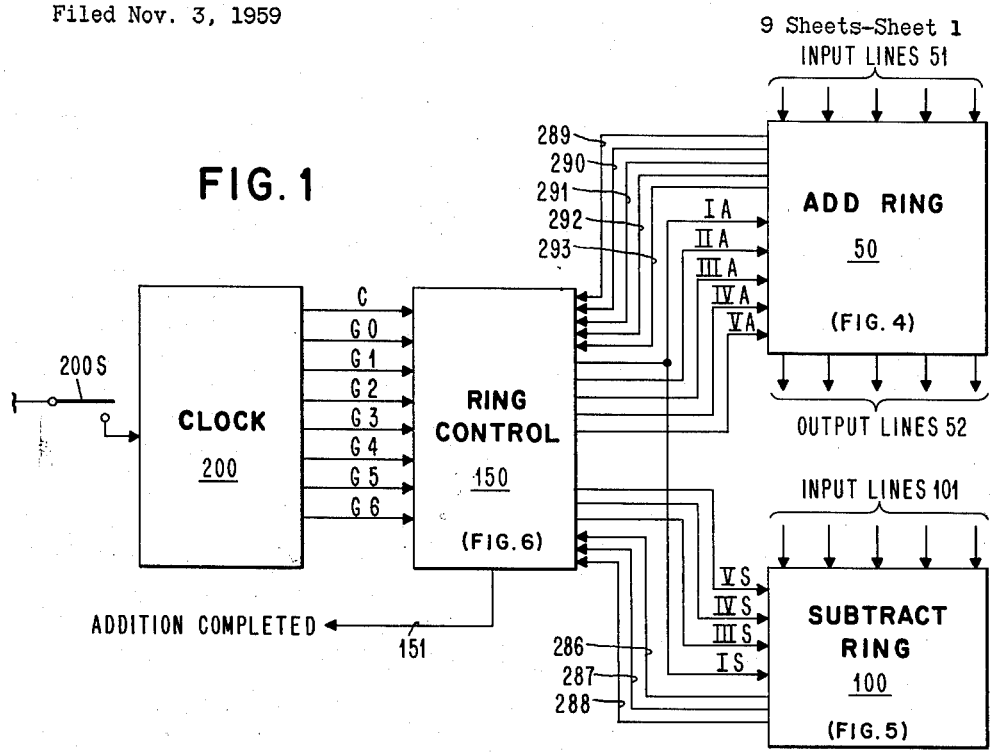
FIG. 1
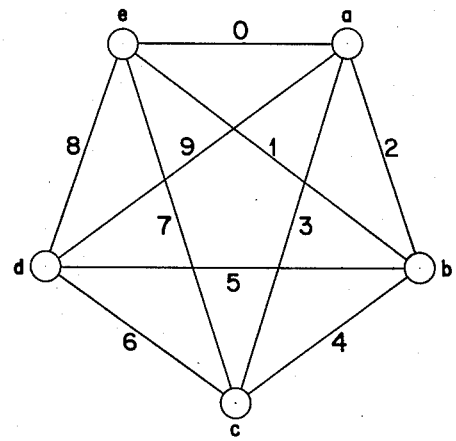
FIG. 2
| DIGIT | a | b | c | d | e |
|---|---|---|---|---|---|
| 0 | 1 | 0 | 0 | 0 | 1 |
| 1 | 0 | 1 | 0 | 0 | 1 |
| 2 | 1 | 1 | 0 | 0 | 0 |
| 3 | 1 | 0 | 1 | 0 | 0 |
| 4 | 0 | 1 | 1 | 0 | 0 |
| 5 | 0 | 1 | 0 | 1 | 0 |
| 6 | 0 | 0 | 1 | 1 | 0 |
| 7 | 0 | 0 | 1 | 0 | 1 |
| 8 | 0 | 0 | 0 | 1 | 1 |
| 9 | 1 | 0 | 0 | 1 | 0 |
FIG. 3
INVENTORS
FRIEDRICH S. WIEDMER
TCHENG-PAO LIOU
BY *Roger S. Smith*
ATTORNEY Sept. 25, 1962  F. S. WIEDMER ETAL  3,055,587
ARITHMETIC SYSTEM
Filed Nov. 3, 1959  9 Sheets-Sheet 2

Sept. 25, 1962    F. S. WIEDMER ETAL    3,055,587
ARITHMETIC SYSTEM
Filed Nov. 3, 1959

Sept. 25, 1962 F. S. WIEDMER ETAL 3,055,587
ARITHMETIC SYSTEM
Filed Nov. 3, 1959 9 Sheets-Sheet 6

Sept. 25, 1962  F. S. WIEDMER ETAL  3,055,587
ARITHMETIC SYSTEM
Filed Nov. 3, 1959  9 Sheets-Sheet 7

Sept. 25, 1962 F. S. WIEDMER ETAL 3,055,587
ARITHMETIC SYSTEM
Filed Nov. 3, 1959 9 Sheets-Sheet 9

United States Patent Office 3,055,587
Patented Sept. 25, 1962

3,055,587
ARITHMETIC SYSTEM
Friedrich S. Wiedmer, San Jose, Calif., and Tcheng-Pao Liou, Zurich, Switzerland, assignors to International Business Machines Corporation, New York, N.Y., a corporation of New York
Filed Nov. 3, 1959, Ser. No. 850,611
Claims priority, application Switzerland Nov. 24, 1958
20 Claims. (Cl. 235—176)

The present invention relates generally to data processing, and more particularly to an electrical system for performing digital arithmetic operations such as addition and subtraction.

Arithmetic systems for digital data processing machines vary widely according to certain requirements of the machines such as speed of operation, data form, and mode of data flow. Such arithmetic systems may be divided into at least two general classes; those which perform binary arithmetic and those which perform arithmetic with number systems of higher radices. Binary arithmetic systems are basically simple in that they are essentially comprised of logical circuits for performing conjunctive and disjunctive operations. Systems for performing arithmetic operations with higher radix number systems are considerably more complex, however, and present many organizational and operational problems. It is toward arithmetic systems of this latter class that the present invention is directed.

One known system for performing arithmetic operations with high radix number systems, such as the decimal system, employs arithmetic tables in the form of matrices in which are stored the results of a given type of arithmetical operation, such as addition, upon a given group of numbers, such as the decimal digits 0 through 9. Addition is performed by "looking up" the stored result for the selected pair of numbers. An arithmetic system of this kind is complex and costly to construct and maintain. A decimal matrix adder for adding one order at a time requires a matrix having one hundred storage locations in addition to control circuitry and carry handling means. A system for adding several orders simultaneously is many times more complex.

It is the primary object of the present invention to provide an arithmetic system for high radix number systems which requires appreciably fewer components than systems heretofore known.

Another object of the invention is to provide an arithmetic system capable of operating at increased speeds.

A further object of the invention is to provide a system and method for arithmetically combining two numbers by concertedly changing the values of said numbers until a selected one of them reaches a predetermined value.

Another object of the invention is to provide a system and method for arithmetically combining two numbers by concertedly changing the values of the numbers in increments of more than one unit at a time.

A still further object of the invention is to provide a system and method for arithmetically combining two numbers by concertedly changing the values of the numbers in increments of more than one unit at a time until one of them reaches a first predetermined value and then changing their values in increments of one unit at a time until the said one of them reaches a second predetermined value.

Another object of the invention is to provide such an arithmetic system wherein a carry is produced and stored when one of said numbers reaches a predetermined value.

Still another object of the invention is to provide such a system wherein a carry stored from a previous operation is added to one of the numbers to be combined by increasing said number by the amount of said carry without increasing or decreasing the other number to be combined.

Another object of the invention is to provide a novel ring circuit operable to advance in a predetermined direction in single advancing steps of one unit or more than one unit each.

The foregoing and other objects, features and advantages of the invention will be apparent from the following more particular description of preferred embodiments of the invention, as illustrated in the accompanying drawings.

In the drawings:

FIGURE 1 is an overall block diagram illustrating an addition system embodying the present invention;

FIGURE 2 is a code chart illustrating a two-out-of-five code which may be employed with the invention;

FIGURE 3 is a graphic illustration of the code shown in FIGURE 2 illustrating the relation of coded digits with the register positions of a stepping ring;

GENERAL DESCRIPTION

FIGURE 1

Figure 4:
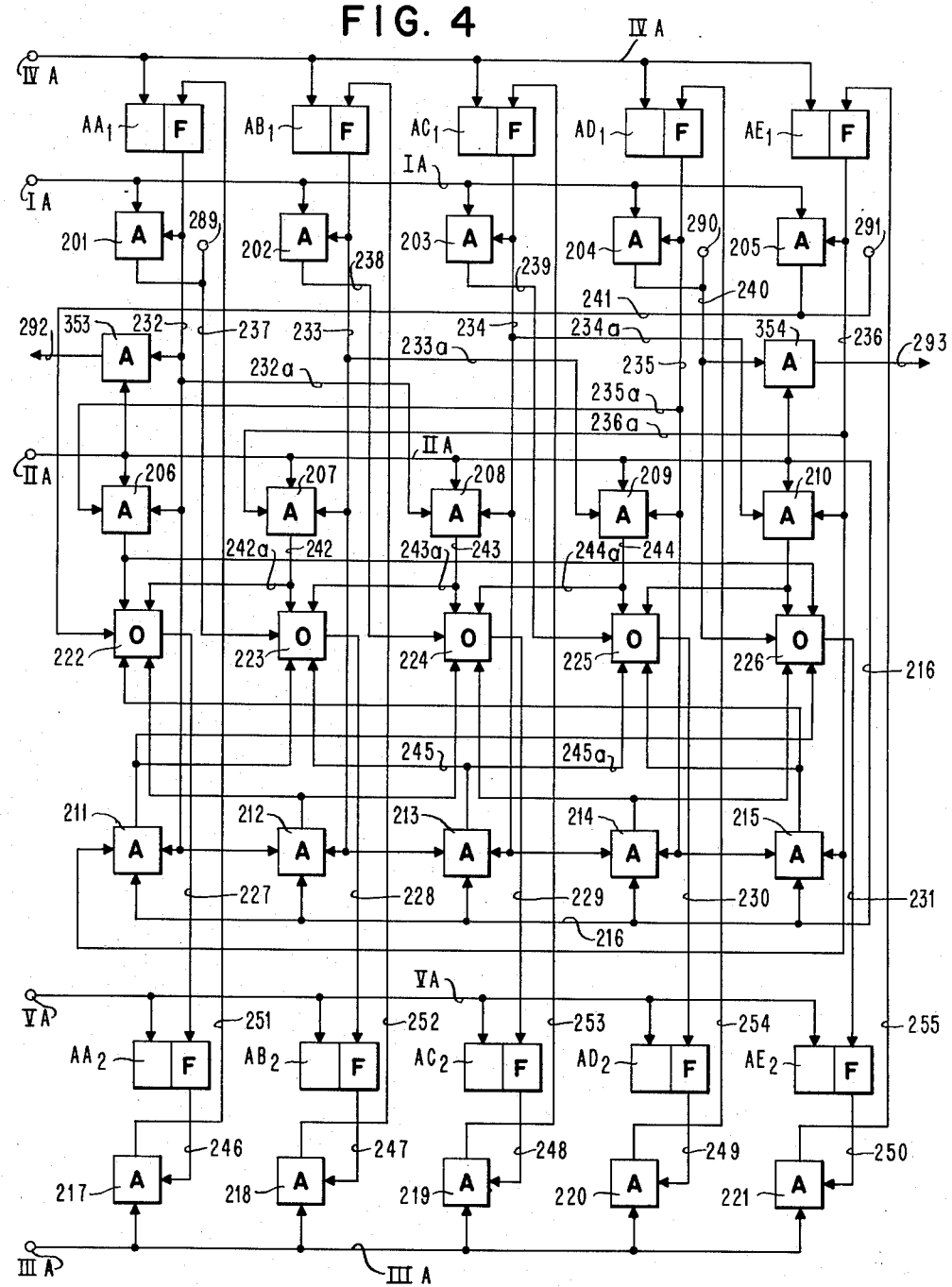
FIGURE 4 is a diagrammatic illustration of an add ring provided in accordance with the invention.

Referring now to the drawings, FIGURE 1 shows, in block diagram form, a decimal addition system which embodies the present invention. The system includes a pair of ring or stepping register arrangements 50 and 100, each described in detail hereinafter, into which decimal digits in coded form are entered for addition. The ring 50 is adapted to advance in a direction to increase the value of the digit inserted therein and is accordingly termed the add ring 50. The ring 100 is adapted to advance in a direction to decrease the value of the number placed therein and is therefore termed the subtract ring 100. The rings 50 and 100 are provided with groups of input lines 51 and 101 respectively through which coded decimal numbers may be entered. As will subsequently appear more clearly, each ring 50 and 100 includes five stages or register positions, and the code employed to represent the several decimal digits includes five binary bits; hence the input line groups 51 and 101 each comprises five separate lines. The lines 51 and 101 may extend to any suitable storage unit (not shown) from which digits may be selected and sent to the rings 50 and 100 for manipulation. Entry of a digit into a ring 50 or 100 is accomplished by setting selected register positions thereof to the binary one state in accordance with the code employed.

Addition of the digits in the rings 50 and 100 is accomplished by advancing the rings 50 and 100 in synchronism. Each advancement increases the value of the digit in the add ring 50 by a predetermined amount and decreases the value of the digit in the subtract ring by an equal amount. The amount of change in value is thus transferred from the subtract ring 100 to the add ring 50 and added to the digit originally stored therein. This process is continued until the total contents of the subtract ring 100 will have been added to the contents of the add ring 50.

Operation of the rings 50 and 100 is controlled by a ring control unit 150 through control lines IA—VA and IS—VS respectively. The unit 150 operates in response to clock pulses generated by a clock 200. After the digits to be added have been entered in the rings 50 and 100, the addition operation is commenced by starting the clock 200 in some suitable manner, as by closing the start switch 200S shown in FIGURE 1. The clock 200 generates a repeating series of seven timed pulses which are transmitted to the control unit 150 over separate lines G0–G6 until stopped, and in addition produces a single non-repeating pulse on line C to indicate commencement of an addition cycle. Initially, the control unit 150 responds to each series or group of pulses G0–G6 by advancing the add ring 50 once in a manner to increase the value of its contents by two units and to advance the subtracting 100 once in a manner to decrease the value of its contents by two units. Advancement continues in this manner until the contents of the subtract ring 100 reaches a decimal value of 0, in the case where an even digit was initially stored, or the decimal value of 1, in the case where an odd digit was initially stored. The condition of certain register positions of the ring 100 is monitored by the control unit 150 through lines 286, 287 and 288. When the condition of these registers indicates that the contents of the ring represent the decimal digit 0, the unit 150 ceases to advance the rings and sends an "addition completed" signal out on a line 151 provided for this purpose. When the condition of the monitored register positions indicate the presence of the decimal digit 1 in the ring 100, the unit 150 ceases to advance the rings 50 and 100 in the normal manner but initiates a modified advancing step in the add ring 50 to increase the value of its contents by one unit instead of two. At the end of this modified step, the addition has been completed and an indication of that fact is given on line 151. The "addition completed" pulses on line 151 may be used to instruct an associated computer to stop the clock 200 or, in the example given, it may merely advise an operator to open the switch 200S.

The results of the completed addition are at this time stored in the add ring 50 and may be read out in the usual manner of reading a register. Read out lines 52 are provided in the ring 50 for this purpose. Since the value of the contents in the subtract ring 100 is of no interest, no such read out lines are provided therefor.

After the contents of the add ring 50 have been read out, the rings 50 and 100 may be cleared in any suitable manner to ready the system for a new operation.

During an addition operation, the contents of the add ring 50 may be increased enough to pass through the radix. The ring is so constructed that with the code employed, it will simply commence to count over from zero when this occurs. For example, if the ring 50 contains the digit 9 and a normal advance step is made, the new value in the ring 50 will be the digit 1. Since it is necessary to produce a carry when the radix is passed, monitoring lines 289, 290, 291, 292 and 293 are provided between the control unit 150 and the ring 50. By means of the monitor lines 289—293 passage through the radix is detected and a carry is produced in the control unit 150. In the embodiment shown in FIGURE 1, addition is performed serially by order and it is necessary to store the carry produced for addition to the next higher order of digits. The control unit 150 contains carry storage means, and additional means are provided for adding the contents of the carry storage means to the digit entered in the add ring 50 prior to commencement of each addition cycle. The carry from one order is thus added to the next higher order. The carry adding means is operated in response to the single pulse C generated by the clock 200 at the commencement of a cycle. The carry storage and carry adding means are fully described later herein.

RETAILED DESCRIPTION

FIGURES 2 and 3

Before passing to a detailed description of the rings 50 and 100 and the control unit 150, an explanation of the code employed thereby will be made. The code is shown in the chart of FIGURE 2. It comprises five bit positions $a$, $b$, $c$, $d$, and $e$, a different two of which contain binary ones for any number from 0 to 9. Consecutive numbers are represented by moving first one and then the other of the binary ones a single bit position to the right. The movement of the binary ones through the several bit positions simulates a walking movement and the code is often refered to as a "walking code."

In FIGURE 3, there is shown a graphic representation of the "walking code" of FIGURE 2 wherein the five bit positions are represented by circles $a$, $b$, $c$, $d$ and $e$ arranged in a circular pattern to simulate a closed ring or stepping register. The numbered lines represent the ten decimal digits. Each line connects the two bit positions which contain binary ones in the corresponding coded digit. For example, the decimal digit 2 is represented in code by binary ones in positions $a$ and $b$. The line numbered with a 2 is accordingly extended between positions $a$ and $b$.

FIGURE 4

Figure 5:
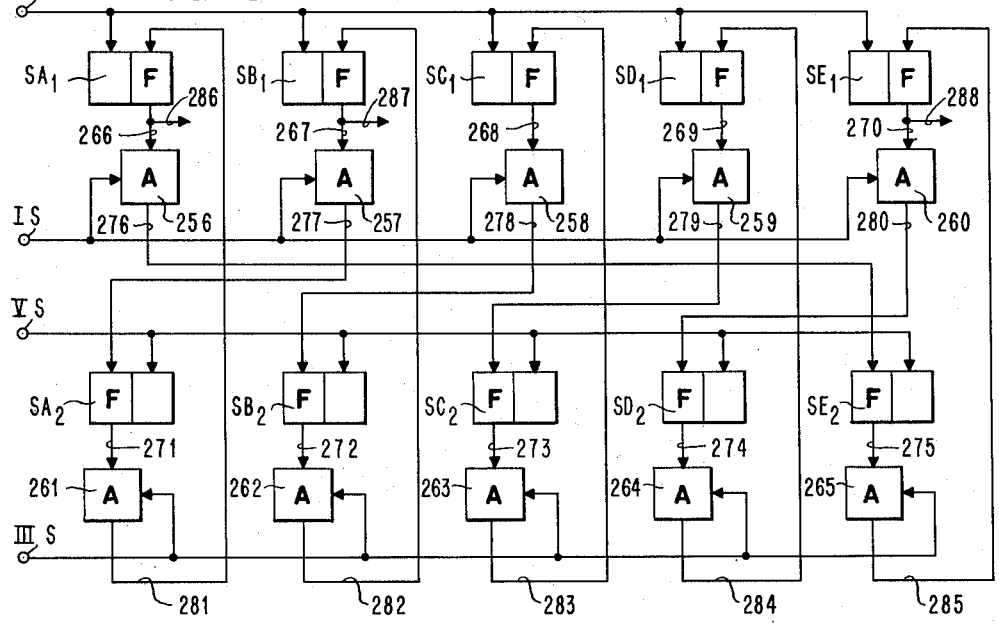
FIGURE 5 is a diagrammatic illustration of a subtract ring.
Figure 16:
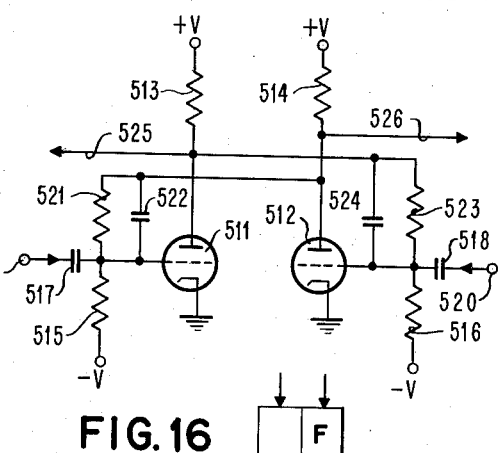
FIGURE 16 illustrates a standard flip flop circuit suitable for use in the circuits of FIGURES 4, 5, 6 and 8, together with the block symbol used to represent the flip flop circuit.

The add ring 50 and subtract ring 100 are illustrated in detail in FIGURES 4 and 5. The add ring 50 includes five primary storage elements $AA_1$, $AB_1$, $AC_1$, $AD_1$ and $AE_1$, and an equal number of secondary storage elements $AA_2$, $AB_2$, $AC_2$, $AD_2$ and $AE_2$. These storage elements, each of which is represented as two contiguous boxes in FIGURE 4 and throughout the drawings are standard binary triggers or flip flops. The details of their construction are shown in FIGURE 16. A standard flip flop has two sections, only one of which conducts at a given time, thus providing two stable states which may be designated as the binary zero state and the binary one state. The two boxes which together form the block symbol of a flip flop in FIGURE 4 represent these two sections. The box containing the letter F represents the section which when conducting represents a binary one. A standard flip flop has two inputs and two outputs respectively represented in the block symbol as lines extending to the tops and from the bottoms of the boxes. The arrowheads pointing to the boxes indicate input lines and those pointing away represent output lines. The input line extending to the lettered box flips the flip flop to the one state when energized, causing the output line at the bottom of the lettered box to be energized. The input line extending to the unlettered box flips the flip flop to the zero state, providing an output on the line extending from the bottom of that box, if such an output line exists. In some cases, for example in the flip flops of FIGURE 4, no zero state outputs are desired and the zero output lines are accordingly omitted.

The primary and secondary storage elements $AA_1$—$AE_1$ and $AA_2$—$AE_2$ of the add ring 50 are arranged to form five register positions. A register position comprises one primary storage element and one secondary storage element, for example elements $AA_1$ and $AA_2$. The register positions are functionally arranged in a closed ring, the position comprising the elements $AA_1$ and $AA_2$ being followed by the position comprising elements $AB_1$ and $AB_2$ and so on through to the position comprising elements $AE_1$ and $AE_2$ which is followed by the position comprising elements $AA_1$ and $AA_2$ to complete the circle. The connections between the storage elements of the ring are such that a binary one stored in a primary storage element is shifted, in response to a group of control pulses, to a selected secondary storage element and then back to a selected primary storage element. Depending upon the control pulses applied, the shifting may be of two distinct kinds. The first is a transfer of each of the two binary ones used to represent a number from the primary storage element of one register position to the primary storage element of the next position. Reference to the diagram of FIGURE 3 will show that such a shift of both binary ones results in an increase in value of the number stored by two units. The second kind of shifting transfers only one of the binary ones from the primary storage element of one register position to that of the next position. This kind of shift increases the value of the digit stored by only one unit. The control pulses for causing the shifting operations just described are transmitted from the control unit 150 over the lines IA, IIA, IIIA, IVA, and VA. These several control lines are shown in FIGURE 4 as entering the ring 50 from the left hand side. The purpose of control line IA is to transfer information from the primary storage elements $AA_1$—$AE_1$ to the secondary storage elements $AA_2$—$AE_2$ in such a way as to initiate a shift which increase the value of the digit stored in the ring 50 by two units. The purpose of line IIA is to transfer information from the primary storage elements to the secondary storage elements in such a way as to initiate a shift which will increase the value of the stored digit by one unit. These two lines are never energized in the same shifting operation. Line IIIA, when energized, transfers information from the secondary storage elements $AA_2$—$AE_2$ to their corresponding primary elements $AA_1$—$AE_1$. This line is energized in every shifting operation. Lines IVA and VA reset or clear the primary and secondary storage elements, respectively. These lines are also energized in every shifting operation.

Figure 17:
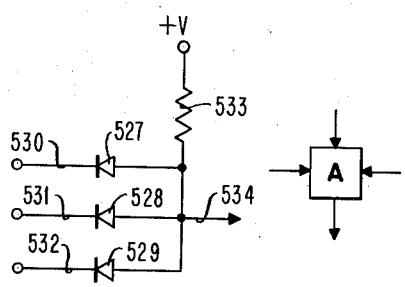
FIGURE 17 illustrates a standard AND circuit suitable for use in the circuits of FIGURES 4, 5, 6, and 8, together with the block symbol used to represent the AND circuit.
Figure 18:
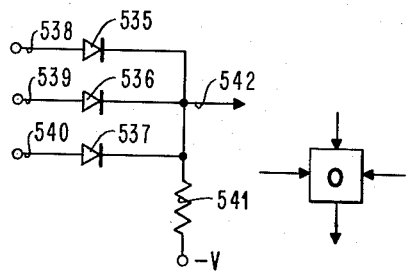
FIGURE 18 illustrates a standard OR circuit suitable for use in the circuits of FIGURES 4, 5, 6 and 8 together with the block symbol used to represent the OR circuit.

Referring now to the specific details of the add ring 50, shown in FIGURE 4, it will be noted that the several primary and secondary storage elements $AA_1$—$AE_1$ and $AA_2$—$AE_2$ are interconnected through a plurality of standard AND circuits each represented by a block bearing the letter A, and a plurality of standard OR circuits, each represented by a block bearing the letter O. The AND circuit, well known in the art, is a conjunctive circuit providing an output only when there is a coincidence of signals at all of its inputs, of which there may be two or more. The OR circuit is a disjunctive circuit producing an output when any one or more of its inputs are energized. Examples of standard AND and OR circuits are shown in FIGURES 17 and 18. The AND and OR circuits of the ring 50 are arranged in several horizontal groups, as may be seen in FIGURE 4. AND circuits 201—205, located directly below the primary storage elements $AA_1$—$AE_1$ operate in response to control pulses on line IA, and each has one of its two inputs connected to that line. AND circuits 206—210 operate in response to control pulses on line IIA, and each has one of its three inputs connected to that line. AND circuits 211—215 also operate in response to pulses on line IIA, one of the three inputs of each being connected to line IIA through connecting wire 216. AND circuits 217—221, located below the secondary storage elements $AA_2$—$AE_2$ operate in response to the control pulses on line IIIA, each having one of its two inputs connected to that line.

The OR circuits 222—226, located between the second and third rows of AND circuits serve to connect the outputs of the AND circuits 201—205, 206—210 and 211—215 to the binary one inputs of the secondary storage elements $AA_2$—$AE_2$ in a manner to be described. The output of each OR circuit 222—226 is connected through one of the lines 227—231 to the binary one input of the secondary storage element located directly below, for example, OR circuit 223 connects through line 228 to the input of storage element $AB_2$.

The AND and OR circuits just described provide, in conjunction with the control lines IA through VA, transfer paths between the primary and secondary storage element to provide the two kinds of shifting operations described hereinbefore. Consider, for example, the connections associated with primary storage element $AA_1$. The binary one output of this element is connected through line 232 to each of the AND circuits 201, 206, and 211, located vertically below, and to the AND circuit 212 located below the following primary storage element $AB_1$, and also through line 232a to the AND circuit 208 located below the second following primary storage element $AC_1$. The other primary storage elements are connected in an analogous manner by lines 233, 233a, 234, 234a, 235, 235a, 236 and 236a. The output of AND circuit 201 is connected by a line 237 to one of the inputs of OR circuit 223 located one position to the right of AND circuit 201. The outputs of AND circuits 202—205 are connected in an analogous manner by lines 238—241, as may be seen in FIGURE 4.

Referring now to the AND circuits 206—210, it has already been mentioned that one of the inputs of each of these circuits is connected to the binary one output of the primary storage element directly thereabove and that another input is connected to the binary one output of the primary storage element located in the second preceding vertical column. Considering AND circuit 209, for example, these connections are made through lines 235 and 233a. The third input for each of these AND circuits 206—210, is connected to line IIA as previously described. The output of each of these AND circuits is connected to the OR circuit located directly therebelow, for example, the output of AND circuit 206 leads to an input of OR circuit 222, the output of AND circuit 207 leads to an input of OR circuit 223, and so on. Three of the coupling conductors are designated by the numerals 242, 243, and 244. Examination of FIGURE 4 will show that the outputs of the AND circuits 206—210 are also connected to inputs of the OR circuits of the next preceding vertical column. For example, the output of AND circuit 207 is connected to an input of OR circuit 222 through a line 242a, the output of AND circuit 208 is connected to an input of OR circuit 223 through a line 243a, the output of AND circuit 209 is connected to an input of OR circuit 224 through a line 244a, and so on.

Referring to the AND circuits 211—215, it has already been mentioned that one of the inputs of each of these AND circuits is connected to the binary one output of the primary storage element in the same vertical column, that another input is connected to the binary one output of the primary storage elements of the next preceding column, and that the third input is connected via common line 216 to control line IIA. The output of each of these AND circuits 211—215 is coupled to inputs of the OR circuits in the preceding column and in the succeeding column. Considering, for example, AND circuit 213, its output is connected via lines 245 and 245a to OR circuits 223 and 225. The outputs of the other AND circuits in this row may be seen to be connected in an analogous manner.

Referring now to the bottom most row of AND circuits 217—221 in FIGURE 4, each of these circuits has one of its two inputs coupled to control line IIIA as previously described. The other input of each of these AND circuits is coupled by one of the lines 246—250 to the binary one output of the secondary storage element $AA_2$—$AE_2$ located in the same vertical column. The outputs of AND circuits 217—221 are connected via lines 251—255 to the binary one inputs of the primary storage elements $AA_1$—$AE_1$ in the same vertical column. The binary zero inputs of the primary storage elements $AA_1$—$AE_1$ are connected to the reset control line IVA. The binary zero inputs of the secondary storage elements $AA_2$—$AE_2$ are coupled to the reset control line VA.

It is believed that the functions of the several elements which comprise the add ring 50 may best be understood by considering examples of the two kinds of shifting operations that the ring 50 is adapted to perform. Consider first the operation wherein the ring is advanced to increase the value of the digit stored therein by two units. Assume that the primary storage elements $AB_1$ and $AC_1$ are in the stable state representing a binary one, and the storage elements $AA_1$, $AD_1$ and $AE_1$ are in the stable state representing a binary zero. Reference to the chart of FIGURE 2 will show that the digit represented by these conditions is the decimal digit 4. Under these conditions, a voltage indicating the binary one state will appear on output lines 233 and 234. The output lines 232, 235 and 236, of elements $AA_1$, $AD_1$ and $AE_1$ will have a voltage of a different value than that which indicates a binary one. In the following description the voltage indicative of a binary one will be referred to as a signal or an output, for the sake of convenience.

The outputs on lines 233 and 234 will apply inputs to the AND circuits 202 and 203. Upon application of a pulse to control line IA, the other input of each of AND circuits 202 and 203 is supplied, permitting an output signal to appear on the output lines 238 and 239. AND circuits 201, 204 and 205 receive only a single input signal, namely the pulse IA, and do not produce an output. From the line 238 the signal produced by AND circuit 202 will pass through OR circuit 224 and therefrom through line 229 to the secondary storage element $AC_2$ which will be switched to the binary one condition. The output signal from the AND circuit 203 passes via wire 239 through OR circuit 225 and therefrom through line 230 to the secondary storage element $AD_2$, switching this element to the binary one condition. It is assumed that all secondary storage elements were initially in the binary zero condition before the pulse IA was applied.

Next a pulse is applied on control line IVA to reset the primary storage elements $AB_1$ and $AC_1$ to the binary zero state. The other primary storage elements $AA_1$, $AD_1$ and $AE_1$, already being in the zero condition are unaffected.

The secondary storage elements $AC_2$ and $AD_2$, having been switched to the binary one condition now provide outputs on the lines 248 and 249 leading to AND circuits 219 and 220. A pulse applied to control line IIIA supplies the other input for each of these AND circuits, thereby producing an output on each of lines 253 and 254 to switch the primary storage elements $AC_1$ and $AD_1$ to the binary one state. When this has been completed, a pulse may be applied to line VA to reset the secondary storage elements $AC_2$ and $AD_2$ and the advancing operation may be considered complete. It will be observed that the binary ones originally stored in storage elements $AB_1$ and $AC_1$ have been transferred to storage elements $AC_1$ and $AD_1$ increasing the value of the digit stored from 4 to 6. This increase in value was accomplished in a single advancing step without passing through the condition representative of the decimal digit 5.

The advancing operation which increases the value of an odd digit by two units is substantially the same as that just described with respect to an even digit. Assume, for example, that the primary elements $AB_1$ and $AD_1$ were initially in the binary one state to represent the decimal digit 5. In this event, application of a pulse to line IA, renders AND circuits 202 and 204 conductive, producing signals on lines 238 and 240. These signals are passed through OR circuits 224 and 226 and through lines 229 and 231 to set secondary storage elements $AC_2$ and $AE_2$ to the binary one state. Application of a reset pulse to line IVA resets primary storage elements $AB_1$ and $AD_1$. Upon application of a pulse to line IIIA AND circuits 219 and 221 are activated, providing outputs on lines 253 and 255 to switch primary storage elements $AC_1$ and $AE_1$ to the one state. The reset pulse applied to line VA resets secondary storage elements $AC_2$ and $AE_2$, leaving the ring with only primary storage elements $AC_1$ and $AE_1$ in the binary one condition to represent the decimal digit 7.

The operation of the add ring 50 to increase the value of digit stored therein by one unit instead of two will next be described. Assume again that the elements $AB_1$, $AC_1$ are in the binary one state to represent the digit 4. Under these conditions an output signal appears on lines 233 and 234. Signals on these lines apply inputs to several of the three way AND circuits in the groups 206—210 and 211—215. Examination of FIGURE 4 will show that of all of these AND circuits, only AND circuit 213 receives two inputs, one from each of lines 233 and 234. Upon application of a pulse to control line IIA (control line IA is not activated when the ring 50 is stepped by a single unit) the third input of AND circuit 213 is supplied, producing a signal on its output lines 245 and 245a. No other AND circuit among the groups 206—210 and 211—215 receives all three inputs, and no other AND circuit is energized at this time. The signals on lines 245 and 245a pass through OR circuits 223 and 225 and thence via lines 228 and 230 to secondary storage units $AB_2$ and $AD_2$ to switch these elements to the binary one state. After the secondary storage elements $AB_2$ and $AD_2$ have been set, a pulse IVA is applied to reset primary storage elements $AB_1$ and $AC_1$. Following this pulse, a pulse is applied to line IIIA to condition AND gates 217—221. Since secondary storage elements $AB_2$ and $AD_2$ are in the binary one state and signals are present on their output lines 247 and 249, AND gates 218 and 220 are rendered conductive. Their output lines 252 and 254 are energized to switch primary storage elements $AB_1$ and $AD_1$ to the binary one state. When this has been completed, reset line VA is energized to reset the secondary storage elements $AB_2$ and $AD_2$ and the operation may be considered completed. The condition of the primary storage elements of the ring 50 now represent the decimal digit 5.

Operation of the ring 50 increase an odd decimal digit by one unit occurs as follows: Assume that the primary storage elements $AB_1$ and $AD_1$ are in the binary one state to represent the decimal digit 5. An output signal is present on each of lines 233 and 235 under these conditions. These output signals supply inputs to several of the three way AND circuits 206—210 and 211—215. Of all the AND circuits, however, only AND circuit 209 receives two inputs, one from line 233 via line 233a and the other from line 235. Upon application of a pulse to control line IIA, the third input is applied to AND circuit 209 providing outputs over lines 244 and 244a to OR circuits 224 and 225 and via lines 229 and 230 to switch secondary storage elements $AC_2$ and $AB_2$ to the binary one state. Following this operation a pulse is applied to line IVA to reset the primary storage elements, then to line IIIA to transfer the binary ones from secondary storage elements $AC_2$ and $AD_2$ to primary storage elements $AC_1$ and $AD_1$, and finally to line VA to reset the secondary storage elements. At the end of the advancing operation, primary storage elements $AC_1$ and $AD_1$ are in the binary one state, representing the decimal digit 6.

It will be noted, with reference to FIGURE 4, that in addition to the circuit elements hereinbefore described there are two AND gates 353 and 354 whose functions have not yet been mentioned. The functions of these elements are described in detail later herein in the section headed "FIGURE 6." Suffice it to say for the present that the purpose of gates 353 and 354 is to apply signals to monitor lines 292 and 293 when the ring 50 indicates a stored number 9 and when a modified advancing cycle is about to be performed, thus insuring that a proper carry is recorded for this step.

FIGURE 5

The subtract ring 100 is shown in detail in FIGURE 5. This unit is similar in construction to the add ring 50 but less complex for the reason that it is only required to perform one kind of stepping operation, i.e., an operation by means of which the decimal digit stored in the ring 100 is decreased in value by two units. The ring 100 comprises five primary storage elements $SA_1$—$SE_1$ and five corresponding secondary elements $SA_2$—$SE_2$, each of which comprises a standard flip-flop circuit such as that shown in FIGURE 16. Control lines IS, IIIS, IVS, and VS extend to subtract ring 100 from the ring control unit 150, as shown in FIGURE 1. The functions of these lines are similar to those of the correspondingly identified control lines leading to the add ring 50. Inasmuch as the ring 100 is not required to advance in steps of one unit, no control line corresponding to line IIA is provided.

Referring now to the specific details of the subtract ring 100, it will be noted that there are provided in addition to the primary and secondary storage elements $SA_1$—$SE_1$ and $SA_2$—$SE_2$, two groups of two input AND circuits, numbered 256—260 and 261—265, respectively. AND circuits 256—260 are located directly below the primary storage $SA_1$—$SE_1$ and each has one of its two inputs supplied by the binary one output line of the storage element directly above. The output lines of the primary storage elements bear the reference numerals 266—270. The other input of each AND circuit 256—260 is supplied from the control line IS. The lower group of AND circuits 261—265 are connected in a similar manner to the binary one output lines 271—275 of the secondary storage elements $SA_2$—$SE_2$ and to the control line IIIS. The AND circuits 256—260 and 261—265 thus serve to gate the outputs of their corresponding storage elements under control of pulses on the control lines IS and IIIS respectively.

The AND circuits 256—260 have output lines 276—280 extending therefrom. Each output line is coupled to the binary one input of the secondary storage element in the first preceding register position of the ring 100 so that information gated out of the primary storage elements is stepped to the secondary elements one position to the left. The output lines 281—285 of the AND circuits 261—265 extend therefrom to the binary one inputs of the primary storage elements $SA_1$—$SE_1$ located directly above, so that information gated from the secondary storage elements is transferred to the primary storage elements of the same register positions.

The control lines IVS and VS are connected to the binary zero or reset inputs of the primary and secondary storage elements respectively, and perform reset functions identical to those of the lines IVA and VA of the add ring 50.

The operation of the ring 100 is relatively simple since only one kind of advancement is performed. Assume, for example, that primary storage elements $SC_1$ and $SD_1$ are in the binary one state to represent the decimal digit 6 and that all other primary and secondary storage elements are reset. Under these conditions lines 268 and 269 will be energized providing inputs to the AND circuits 258 and 259. Upon application of a control pulse to line IS the AND circuits 258 and 259 will be rendered conductive providing outputs on their output lines 278 and 279 to switch secondary storage elements $SB_2$ and $SC_2$ to the binary one state. Following the pulse IS, a pulse is applied to control line IVS to reset primary storage elements $SC_1$ and $SD_1$. Secondary storage $SB_2$ and $SC_2$ are now in the binary one state, providing outputs on lines 272 and 273. Upon application of a pulse to control line IIIS these outputs are gated through AND circuits 262 and 263 and over lines 282 and 283 to set primary storage elements $SB_1$ and $SC_1$ to the binary one state. A pulse may then be applied to line VS to reset the secondary storage elements $SB_2$ and $SC_2$.

It will be seen that during the above described advancing step, the decimal digit 6 originally stored in the subtract ring 100 has been decreased in value by two units so that the binary ones stored in elements $SB_1$ and $SC_1$ now indicate the decimal digit 4.

Examination of FIGURE 5 will show that the transfer of a binary one from a primary storage element through the secondary storage element of the next preceding register position and thence to the primary storage element of said next preceding register position occurs over a single unchanging route which is independent of the conditions of other storage elements in the ring. Since this is true, it is immaterial whether the two binary ones stored in the ring 100 are in adjacent positions to represent an even digit or in alternate positions to represent an odd digit. An explanation of an advancing operation to reduce the value of an odd digit by two units is therefore believed unnecessary.

FIGURE 6

Figure 7:
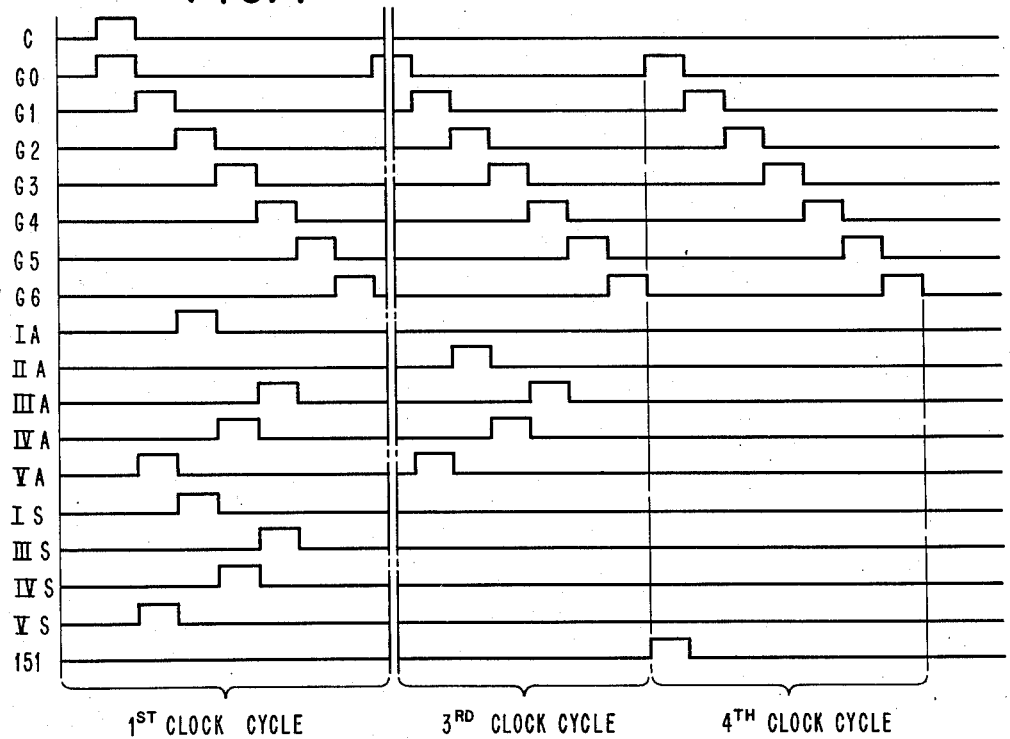
FIGURE 7 is a timing chart illustrating an example of an adding operation.
Figure 6:
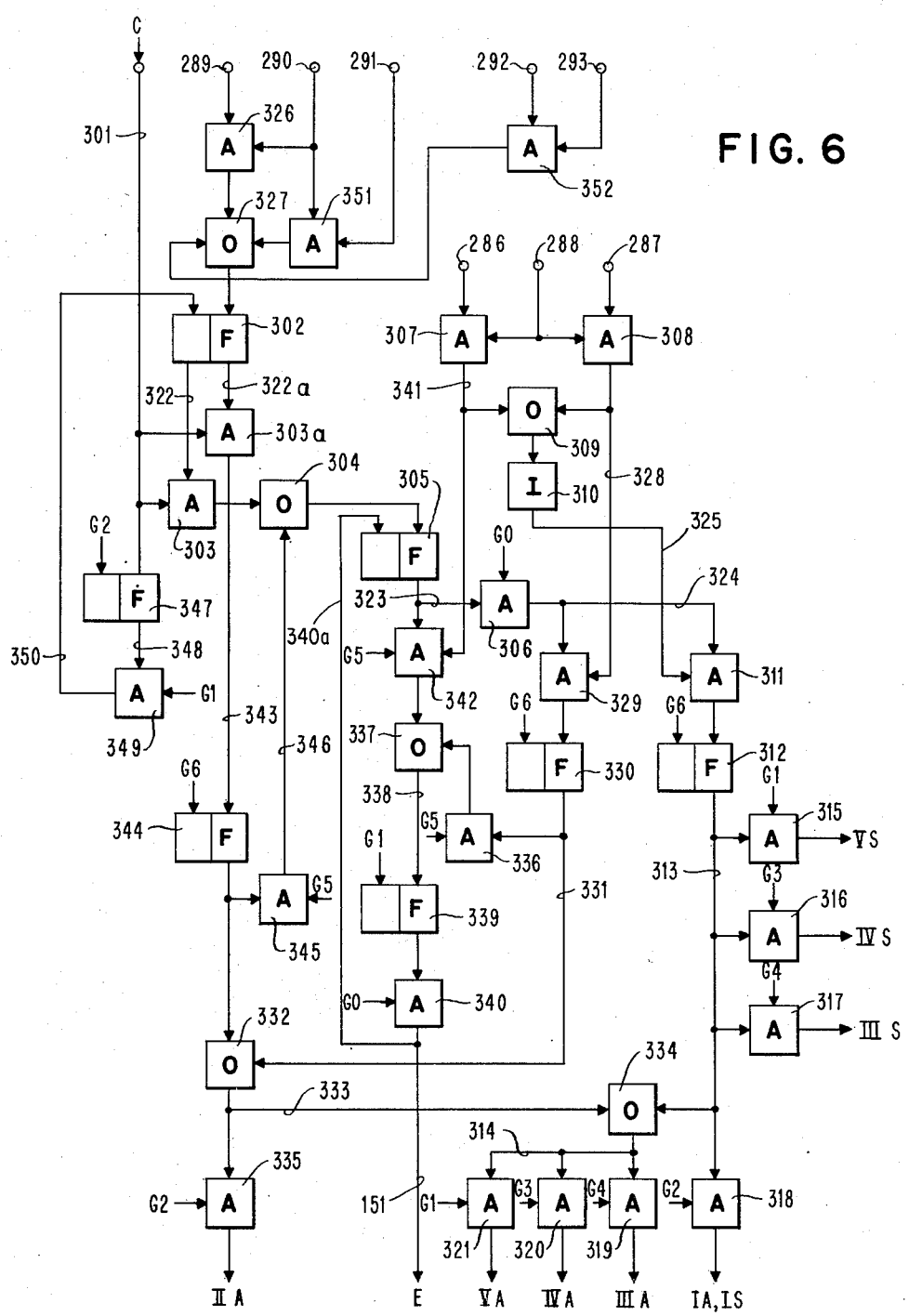
FIGURE 6 is a diagrammatic illustration of a control circuit suitable for operating the add and subtract rings of FIGURES 4 and 5.

The stepping operations of the add ring 50 and the subtract ring 100 are controlled by the ring control unit 150, shown in detail in FIGURE 6. This unit operates in response to clock pulses C and G0–G6 produced by the clock 200. The sequence of the pulses C and G0–G6 as well as the various pulses generated by the control unit 150 for a sample add operation to be described, are shown in the timing chart of FIGURE 7. It will be observed that the clock pulse C is produced only at the commencement of an add operation while the pulses G0–G6 are produced in repeating sequence until the clock 200 is stopped. The clock mechanism is not shown in detail, since such devices are well known in the art. Any suitable mechanism is sufficient, for example, a seven stage timing ring or delay line may be used for producing the pulses G0–G6 and a single shot multivibrator may be used for producing the pulses C.

Referring again to FIGURE 6, the control unit 150 consists of a plurality of interconnected logical circuits including AND circuits, OR circuits, an INVERTER circuit and flip flops, all shown in symbolic block form. The details of each of these several circuits may be seen in FIGURES 16-19. The timing pulses C and G0–G6 are applied to the unit 150 at several points. Each point of application is designated by a short arrow labeled with the reference character of the clock pulse applied at that point. It will be understood, of course, that in an actual embodiment, a conductor would be provided from the clock terminals to the control unit 150 at the point indicated by each of the labeled arrows.

To keep the explanation of the control unit as simple as possible, the description of the unit 150 and the operation thereof will be given together. Assume, for the purposes of the following description, that the addition of 7+5 is to be performed and that the numbers 7 and 5 have been entered in the add and subtract rings 50 and 100 respectively. Assume further that each of the flip flops 302, 305, etc. shown in FIGURE 6 is initially in its binary zero or reset condition.

The addition operation is commenced by starting the clock 200. Immediately upon energization, the clock 200 produces a pulse C and simultaneously therewith, a pulse G0 (see FIGURE 7). The pulse C is applied to conductor 301 of the control unit 150 and passes therefrom to one input of two input AND circuit 303. The other input of AND circuit 303 is coupled to the binary zero output line 322 of flip flop 302. Flip flip 302 serves as a carry storage unit, as will presently appear more clearly. In the example presently under consideration, it is in the reset state, so a signal appears on its binary zero output line 322 to gate pulse C through AND circuit 303. From AND circuit 303 the pulse C is transmitted through OR circuit 304 to the binary one input of flip flop 305, causing this element to be switched to the binary one state. When flip flop 305 is switched, a signal is transmitted on line 323 to one of the inputs of AND circuit 306. Except for the negligible time delays of the circuit components 303, 304, and 305, this signal occurs simultaneously with the clock pulse G0 which, it will be noted, is applied to the other input of AND circuit 306. Clock pulse G0 gates the pulse on line 323 through AND circuit 306 and over line 324 to two input AND gate 311. The other input of this gate is connected through line 325 to INVERTER circuit 310. INVERTER 310 has its input connected through OR circuit 309 to the output lines of AND circuits 307 and 308. The inputs for these AND circuits are provided from monitor lines 286, 287 and 288, mentioned earlier herein, which extend from the binary one output lines 266, 267 and 270 of the primary storage elements $SA_1$, $SB_1$ and $SE_1$, of the subtract ring 100. Lines 286, 287 and 288 monitor the condition of storage elements $SA_1$, $SB_1$, and $SE_1$ to provide indications to the control unit 150 when the ring 100 has been counted down to a decimal 1 or a decimal 0. A decimal 1 in the ring 100 is represented by binary ones in primary storage elements $SB_1$ and $SE_1$. When this condition exists, signals are transmitted from the binary one output lines 267 and 270 of these storage elements over monitor lines 287 and 288 to the inputs of AND circuit 308 producing a signal on line 328 of control unit 150 to indicate the presence of a decimal 1 in the ring 106. A decimal 0 in the ring 100 is represented by binary ones in storage elements $SA_1$ and $SE_1$. When this condition exists, signals are transmitted from the binary one output lines 266 and 270 of these storage elements and over monitor lines 286 and 288 to the inputs of AND circuit 307, producing a signal on line 341 of control unit 150 to signify the presence of a decimal 0 in the ring 100.

Since the ring 100 now has a decimal 5 stored therein, neither AND circuit 307 or 308 is energized and no signal is provided to the input of INVERTER 310. The function of an INVERTER is to produce a signal at its output when no signal appears at its input and a signal accordingly appears on line 325 to gate the signal on line 324 through AND circuit 311 and to the binary one input of flip flop 312 to set this element on the binary one state. When flip flop 312 is set, a signal appears on line 313. This signal is applied to the inputs of AND circuits 315, 316, 317 and 318 and also through OR circuit 334 and via line 314 to the inputs of AND circuits 319, 320 and 321.

The outputs of the AND circuits 315—321 provide the various control pulses for stepping the rings 50 and 100 to respectively increase and decrease their contents by two units. The outputs of AND circuits 315, 316 and 317 are connected to control lines VS, IVS, and IIIS, respectively, of the subtract ring 100. The output of AND circuit 318 is connected to the control lines IA of the add ring 50 and IS of the subtract ring 100. AND circuits 319, 320 and 321 are connected to the control lines IIIA, IVA and VA, respectively, of the add ring 50. Each of these AND circuits 315—321 has, in addition to the input supplied by the line 313 or 314, a second input which is supplied by one of the clock pulses G1—G4. AND circuits 315 and 321 are supplied by clock pulse G1, AND circuit 318 is supplied by pulse G2, AND circuits 316 and 320 are supplied by pulse G3, and AND circuits 317 and 319 are supplied by pulse G4.

Summarizing the operation of the control unit 150 to this point, it will be seen that coincident application of pulses C and G0 has resulted in the setting of flip flops 305 and 312 with the consequent energization of lines 313 and 314. Following these pulses a pulse G1 is supplied by clock 200 (see FIGURE 7). This pulse supplies the second input for each of the AND circuits 315 and 321, rendering these circuits conductive and providing outputs on control lines VA and VS. These output pulses reset the secondary storage elements in the rings 50 and 100 of FIGURES 4 and 5.

After pulse G1, the clock 200 supplies a pulse G2 to AND circuit 318, rendering it conductive and providing outputs on control lines IA and IS. The pulse on line IA transfers the binary ones in primary storage elements $AC_1$ and $AE_1$ of the add ring 50 to secondary storage elements $AD_2$ and $AA_2$ in the manner hereinbefore described. The pulse on line IS transfers the binary ones from primary storage elements $SB_1$ and $SD_1$ of the subtract ring 100 to secondary elements $SA_2$ and $SC_2$.

Following clock pulse G2, pulse G3 is applied to the control unit 150. This pulse renders AND gates 316 and 320 conductive to produce outputs on control lines IVS and IVA. These outputs reset the primary storage elements of the two rings 50 and 100 in the manner hereinbefore described.

The next clock pulse applied to the unit 150 is the pulse G4. This pulse opens AND gates 317 and 319 to produce outputs on control lines IIIS and IIIA. The output on line IIIA transfers the binary ones from add ring secondary storage elements $AD_2$ and $AA_2$ so that the add ring now contains the decimal digit 9. The output on line IIIS transfers the binary ones from subtract ring secondary storage elements $SA_2$ and $SC_1$ so that the subtract ring now contains the decimal digit 3.

Following clock pulse G4, pulses G5 and G6 appear in sequence. Pulse G5 has no effect on the unit 150 under the presently prevailing conditions. Pulse G6 resets flip flop 312 and de-energizes lines 313 and 314.

At the end of the first clock cycle, the unit 150 has produced control pulses for the rings 50 and 100 in proper sequence to increase the digit in add ring 50 by two units from 7 to 9 and to decrease the digit in subtract ring 100 by two units from 5 to 3. The decimal number 2 has effectively been taken from ring 100 and added into ring 50.

Before considering the second clock cycle, it should be kept in mind that flip flop 305 of control unit 150 has not been reset to the binary zero state. Its binary one output line 323 remains energized. Therefore, upon application of pulse G0 of the second clock cycle (there being no pulse C except at the beginning of the first clock cycle of an add operation) AND gate 306 is opened and an output appears on line 324. Since the decimal number presently stored in subtract ring 100 is not a 1 or a 0, no signal will be present at the input of INVERTER 310 and line 325 will be energized to gate the signal on line 324 through AND circuit 311 to set flip flop 312 to the binary one state, and thereby energize lines 313 and 314.

Pulse G1 of the second clock cycle opens AND gates 315 and 321 in the same manner as before to produce outputs on control lines VS and VA. These outputs reset the secondary storage elements of the rings 50 and 100 and ready them for the next stepping operation.

Pulse G2 of the second clock cycle opens AND gate 318 to produce outputs on control lines IA and IS, as before. The output on line IA transfers the binary ones stored in add ring primary elements $AD_1$ and $AA_1$ to secondary elements $AE_2$ and $AB_2$. The output on control line IS transfers the binary ones from subtract ring primary storage elements $SC_1$ and $SA_1$ to secondary storage elements $SB_2$ and $SE_2$.

Clock pulse G3 of the second clock cycle renders AND gates 316 and 320 conductive to produce a pulse on each of control lines IVS and IVA to reset the primary storage elements of the rings 50 and 100 as before.

Clock pulse G4 opens AND gates 317 and 319 to produce control pulses on lines IIIS and IIIA. The pulse line IIIA transfers the binary ones from add ring secondary storage elements AE₂ and AB₂ to primary elements AE₁ and AB₁ so that the add ring 50 now contains the decimal 1. The pulse on line IIIS transfers the binary ones from subtract ring secondary elements SE₂ and SB₂ to primary elements SE₁ and SB₁ so that the ring 100 also contains the decimal 1.

Clock pulse G5 again has no effect on the control unit 150. Clock pulse G6 again resets the flip flop 312.

It should be noted at this point that the number stored in add ring 50 has passed through the radix ten and that a carry must be produced. In the interest of clarity, the means for recognizing the conditions for which a carry must be produced and for producing and storing the carry will be ignored for the present and explained later herein.

At the end of the second clock cycle, the value of the digit in the add ring has been changed from 9 to 1 (which in combination with a carry, represents the decimal digit 11) and the digit in the subtract ring has been changed from 3 to 1. To complete the addition under these circumstances, it is necessary to modify the advancing operation and advance the ring 50 to increase the value of the digit therein by only one unit.

Since the digit in the subtract ring 100 is represented by binary ones in storage elements SB₁, and SE₁, the subtract ring monitor lines 287 and 288 are energized and the AND circuit 308 of the control unit 150 to which they provide inputs, is rendered conductive. The output of AND circuit 308 is passed via OR circuit 309 to INVERTER 310, causing it to cease producing a signal on line 325. Since line 325 is no longer energized, AND gate 311 is blocked and the setting of flip flop 312, necessary for carrying out a normal advance-by-two-unit operation, is prevented. The signal on output line 328 of AND circuit 308 provides an input to AND gate 329, however, and upon application of block pulse G0 of the third clock cycle to AND gate 306, the signal on line 324 is gated through AND gate 329 to set flip flop 330 to the binary one state. The setting of flip flop 330 produces an output on line 331 which is transmitted through OR circuit 332, line 333, and OR circuit 334 to the line 314. AND circuits 319, 320 and 321 are thus provided with inputs while AND circuits 315, 316, 317, and 318 are not. The output on line 331 is also transmitted via OR circuit 332 to AND gate 335, the output of which is connected to the control line IIA. It will be recalled that this control line is energized in place of line IA when the add ring 50 is to be advanced by one unit.

Upon occurrence of clock pulse G1 of the third clock cycle AND gate 321 is opened to produce a pulse on control line VA. This control pulse resets the secondary elements of the add ring 50 as described before.

The clock pulse G2 of the third clock cycle renders AND circuit 335 conductive to produce an output on control line IIA. This output transfers the binary ones in primary storage elements AE₁, and AB₁, of add ring 50 to secondary storage elements AA₂ and AB₂.

Clock pulse G3 opens AND gate 320 to produce a pulse on control line IVA to reset the primary storage elements of add ring 50.

Clock pulse G4 opens AND gate 319 to produce a pulse on control line IIIA to transfer the binary ones from the add ring secondary storage elements AA₂ and AB₂ to their corresponding primary storage elements AA₁ and AB₁.

The add ring now contains the digit 2 which, in combination with a carry, actually represents the digit 12. The subtract ring 100 has not been affected by the pulses G0–G4 of the third clock cycle. The addition operation has been completed and all that remains to be done is to give an indication of this fact and return the control unit 150 to its quiescent state.

It will be noted that pulse G5 of each clock cycle is applied to AND circuit 336, among other places. During the first and second clock cycles, line 331 was not energized so this clock pulse had no effect. The line 331 is energized at present, however, and upon occurrence of the clock pulse G5 of the third clock cycle AND gate 336 is opened and the signal on line 331 is transmitted via OR circuit 337 and line 338 to the binary one input of flip flop 339, setting this element in the binary one state.

The following pulse G6 of the third clock cycle resets flip flop 330 to the binary zero state.

The commencement of the fourth clock cycle finds flip flop 339 in the binary one state. Clock pulse G0 of the fourth cycle gates its output through AND gate 340 to the control line 151 which is employed to indicate a completed addition. The output of AND gate 340 also passes via line 340a to the binary zero input of flip flop 305 to reset that element.

Clock pulse G1 of the fourth clock cycle resets flip flop 339 to its binary zero state. Clock pulses G2, G3, G4, G5 and G6 have no effect on the circuit since all of the elements are in the reset state.

The addition having been completed the sum stored in ring 50 may be read out over lines 52, shown in FIG. 1, and the primary elements of the rings 50 and 100 may be reset in preparation for entry of new numbers to be added.

In the example given above, the digit stored in the subtract ring 100 was an odd digit so that the ring was counted down until the digit reached the value of 1, at which time a modified advancing step was carried out in the add ring 50. Had the digit stored in the subtract ring 100 been an even digit, then it would have been decreased by two units at a time until its value reached 0. Under the circumstances, no modified advancing step would have been required. It will be recalled that during a normal advancing operation, the new decreased digit is transferred from the secondary storage elements of the subtract ring 100 to the primary storage elements by application of a pulse to control line IIIA. It will further be recalled that this line is pulsed during occurrence of clock pulse G4 of a clock cycle. To explain the operation of control unit 150 when the digit stored in ring 100 reaches the decimal value of 0, assume that pulse G4 had just been applied and that binary ones were transferred to storage elements SA₁ and SE₁ of the ring 100 to indicate a digit 0. The presence of binary ones in these storage elements produces signals upon monitor lines 286 and 288 and causes AND circuit 307 of the control unit 150 to be rendered conductive. The consequent signal on output line 341 of AND circuit 307 passes through OR circuit 309 to INVERTER 310, causing its output to fall. This blocks AND gate 311 so that subsequently a clock cycle will not cause advancement of rings 50 and 100.

The signal on line 341 also provides an input to AND circuit 342. Upon occurrence of the clock pulse G5, this signal is gated through AND gate 342 and through OR circuit 337 and line 338 to set flip flop 339 to the binary one state so that upon occurrence of pulse G0 of the following clock cycle, AND circuit 340 will be energized to produce a signal on line 151 to indicate a completed operation and to reset flip flop 305, as explained above.

It was mentioned earlier herein that means are provided for producing and storing a carry when necessary. It has also been mentioned that the function of flip-flop 302 is to store a carry. A description of the carry producing operation will now be made.

A carry must be produced whenever the digit in the add ring 50 increases in value to 10 or above. This may occur in three different ways. First, the add ring may contain a digit 8 and a normal advancing operation may be carried out to increase its value by two units. Second, the digit in the ring 50 may have a value of 9 and a normal advancing operation may be carried out to increase its value by two units. Finally, the add ring may contain a digit 9 and a modified advancing step may be carried out to increase its value by one unit. Means are provided for producing a carry under each of these conditions.

The five monitor lines 289—293 shown as extending between the ring 50 and control unit 150 in FIGURE 1 serve to indicate the presence of conditions which require a carry. Lines 290 and 291 are employed in the case where the ring 50 contains an 8 and is being advanced in the normal manner. Reference to FIGURE 6 will show that these lines connect to the two inputs of an AND circuit 351, the output of which is connected through an OR circuit 327 to the binary one input of carry storage flip flop 302. Whenever lines 290 and 291 are coincidently energized, flip flop 302 will be switched to the binary one state. Reference to FIGURE 4 will show that lines 290 and 291 also connect to the output lines 240 and 241 of AND circuits 204 and 205 of the ring 50. It will be recalled that these AND circuits become conductive only when their corresponding primary storage elements $AD_1$ and $AE_1$ contain binary ones and when a pulse is applied to control line IA to initiate a normal advancing step which increases the value of the digit stored in ring 50 by two units. Lines 290 and 291 are coincidently energized to produce a carry, then, only when the storage elements $AD_1$ and $AE_1$ are in the binary one state to indicate a digit 8 and the control line IA is energiezd.

Monitor lines 289 and 290 are employed to produce a carry in the case where the add ring contains a 9 and a normal advancing step is carried out. Reference to FIG. 6 will show that these lines connect to the inputs of an AND circuit 326, the output of which is coupled through OR circuit 327 to the binary one input of flip flop 302. When lines 289 and 290 are coincidently energized, AND circuit 326 is activated to store a carry in flip flop 302. The connection of monitor line 290 to the line 240 of add ring 50 has been described. Reference to FIG. 4 will show that monitor line 289 is connected in a similar manner to output line 237 of AND circuit 201. With this arrangement, signals will appear coincidently on lines 289 and 290 only when primary storage elements $AA_1$ and $AD_1$ are in the binary one state to represent the digit 9 and when control line IA is energized to carry out a normal advancing step.

Monitor lines 292 and 293 are employed to produce a carry in the case where a 9 is stored in add ring 50 and a modified advancing step is being carried out. It will be seen in FIG. 6 that these lines form the inputs for an AND circuit 352, the output of which is coupled through OR circuit 327 to the binary one input of flip flop 302. When lines 292 and 293 are coincidently energized, the output of AND circuit 352 sets the flip flop 302 to store a carry. Referring now to FIG. 4, it will be seen that lines 292 and 293 are connected, respectively, to the outputs of two way AND circuits 353 and 354. AND circuit 353 has one of its inputs connected to the binary output line 232 of primary storage element $AA_1$ while AND circuit 354 receives one of its inputs from the binary one output line 235 of element $AD_1$. The second input for each AND circuit 353 and 354 is provided by the control line IIA. Only in the case where the elements $AA_1$ and $AD_1$ are in the binary one state to represent a digit 9 and a modified advancing cycle is being initiated by application of a pulse to line IIA, will monitor lines 292 and 293 be coincidently energized.

A carry stored in the flip flop 302 may be used in several ways. In a parallel adder, wherein an arrangement such as shown in FIG. 1 is provided for each order of digits to be added, the carry might be read out of flip flop 302 during an addition operation and transferred to the adder of the next higher order. The embodiment shown and described herein is a serial adder, however, wherein the digits of each order are added, low order first, in a serial fashion. In this type of adder, the carry produced during addition of the digits of a given order is stored until the digits of the next higher order have been entered in the adder and then it is added to one of the digits of said next higher order. The arrangement for accomplishing this result is shown in FIG. 6.

It will be recalled that at the commencement of each addition operation after the new digits to be added have been entered in rings 50 and 100, the clock 200 produces a single non-repeating pulse C. It has been mentioned that this pulse C is applied to the control unit 150 over wire 301 and is passed through AND circuit 303 to set flip flop 305. The setting of flip flop 305 is necessary before the control unit 150 can function in the manner hereinbefore described. Examination of FIGURE 6 will show that pulse C is gated through AND circuit 303 to the binary one input of flip flop 305 only when the flip flop 302 is in the binary zero state. In the event that upon commencement of a new addition operation a carry from the next lower order is stored in the flip flop 302, the AND circuit 303 will be closed and flip flop 305 will not be set. Line 301 also connects to AND circuit 302a, however, which receives a second input over line 322a from the binary one output of flip flop 302. When a carry is stored in flip flop 302, the pulse C is gated through AND circuit 302a and over line 343 to set flip flop 344 to the binary one state. The binary one output of this element is transmitted through OR circuit 332 to AND gate 335 and over line 333, OR circuit 334 and line 314 to AND gates 319, 320 and 321. The conditioning of these several AND circuits readies the control unit 150 to conduct a modified advancing operation wherein the add ring 50 is increased by one unit and the subtract ring is left unchanged. Upon occurrence of the pulses G1, G2, G3 and G4 of the first clock cycle, the modified operation is carried out. One decimal unit (the carry in this case) is added to the ring 50 in the manner already described.

During this first clock cycle, several changes take place in the unit 150. Referring again to the time when pulse C is applied, it will be noted that line 301 is connected to the binary one input of a flip flop 347. Flip flop 347 is set upon application of pulse C to energize a line 348 which provides an input to AND gate 349. Upon occurrence of clock pulse G1 of the first clock cycle, AND gate 349 is rendered conductive, applying a signal on line 350 to reset the carry flip flop 302. Pulse G2 of the first clock cycle then resets flip flop 347.

Upon occurrence of clock pulse G5 of the first clock cycle, after the modified advancement of add ring 50 has been completed, AND gate 345, which receives inputs from the binary one output of flip flop 344 and from pulse G5, is opened. Its output travels over line 346 and through OR circuit 304 to set flip flop 305 in the binary one state so that upon occurrence of pulse G0 of the second clock cycle, AND circuit 306 will be opened and normal operation of the control unit 150 will be resumed.

Upon occurrence of pulse G6 of the first clock cycle flip flop 344 is reset and the carry adding arrangement is returned to its quiescent state. The carry has been added to the number stored in the ring 50 and the control unit 150 has been conditioned to commence normal operations upon application of pulse G0 of the next clock cycle.

FIGURE 8

So far there have been described circuits wherein the computing operation is performed by adding units of two in the add ring 50 and subtracting units of two in the subtract ring 100. It is also possible to arrange circuits of the type shown so that addition in steps of one unit at a time is performed. For such an arrangement, the control circuit that supplies pulses for the operation becomes substantially more simple. On the other hand, these circuits do not have the advantage of the increased computing speed inherent in the circuits which add two at a time.

An add ring for advancing by single units may be provided by removing the control line IA and the AND circuits 201—205 from the ring 50. This ring already contains the necessary elements and connections for advancing by single units. It is not believed necessary to show a specific example of an add ring designed for single unit advancement.

Figure 8:
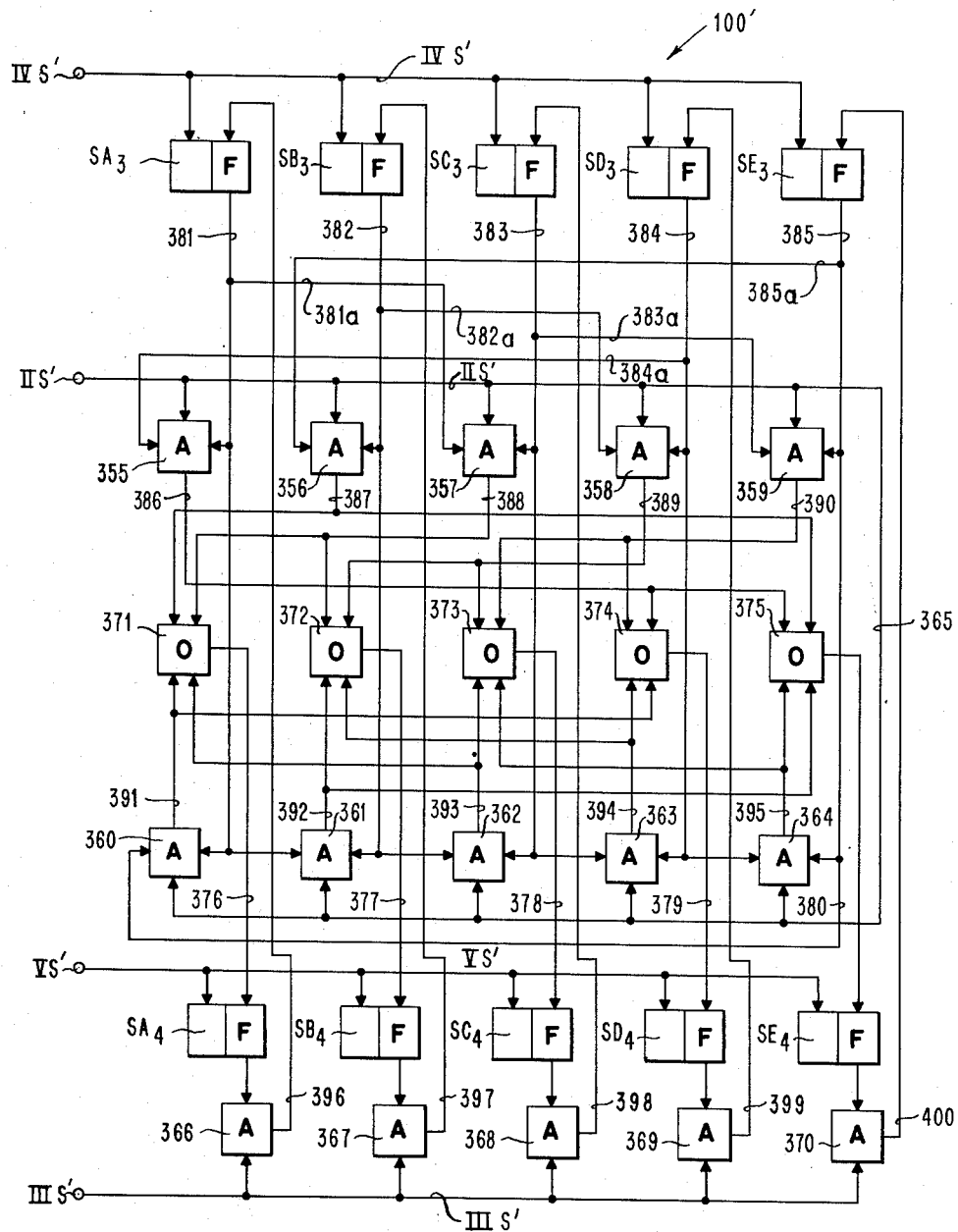
FIGURE 8 illustrates an embodiment of an add ring designed to advance by single units only.

An example of a subtract ring for advancing by single units is shown in FIGURE 8. This ring, identified by the reference character 100′, includes five primary storage elements $SA_3$—$SE_3$ and five secondary storage elements $SA_4$—$SE_4$. The primary and secondary storage elements may comprise standard flip flops such as the one shown in FIGURE 16. They are interconnected by a plurality of AND and OR circuits in a manner generally similar to the connections of the elements for providing single unit advancement in the ring 50. The AND and OR circuits of FIGURE 8 are arranged in several horizontal rows. AND circuits 355—359, located directly below the primary storage elements $SA_3$—$SE_3$ operate in response to control pulses on control line IIS′ and each has one of its three inputs connected to that line. AND circuits 360—364, located directly above the secondary storage elements $SA_4$—$SE_4$ also operate in response to pulses on control line IIS′ and each has one of its three inputs connected to control line IIS′ through a line 365. AND circuits 366—370, located below the secondary storage elements $SA_4$—$SE_4$ operate in response to control pulses on line IIIS′, and each has one of its two inputs connected to that line.

The OR circuits 371—375, located between the AND circuits 355—359 and the AND circuits 360—364, serve to connect the outputs of these two rows of AND circuits to the binary one inputs of the secondary storage elements $SA_4$—$SE_4$ in a manner to be described. The output of each OR circuit 371—375 is connected through one of the lines 376—380 to the binary one input of the secondary storage element located directly therebelow, for example, OR circuit 372 connects through output line 377 to the binary one input of secondary storage element $SB_4$.

The AND and OR circuits just described provide, in conjunction with the control lines IIS′ through VS′, paths between the primary and secondary storage elements for the transfer of binary ones in a manner to decrease the value of a digit stored in the ring 100′ by one unit at a time. Consider, for example, the connections associated with primary storage elements $SA_3$. The binary one output of this element is connected through an output line 381 to one of the inputs of each of AND circuits 355 and 360 located directly therebelow and to an input of AND circuit 361 located in the next following vertical column of elements. The binary one output of primary flip flop $SA_3$ is also connected through a line 381a to one of the inputs of AND circuit 357 located in the second following vertical column of elements. The other primary storage elements are connected in an analogous manner by output lines 382, 382a, 383, 383a, 384, 384a, 385 and 385a. It will be observed that these connections in combination with the control line IIS′ and its extension 365, provide three inputs for each of the AND circuits 355—359 and 360—364.

The output of each of AND circuits 355—359 is connected through one of the lines 386—390 to each of the OR circuits of the two preceding vertical columns, for example, the output of AND circuit 357 connects through line 388 to each of AND circuits 371 and 372.

The output of each of the AND circuits 360—364 is connected through one of the lines 391—395 to the OR circuit in the same vertical column and through the OR circuit in the second preceding vertical column; for example, the output of AND circuit 363 connects through line 394 to OR circuit 374 in the same vertical column and to OR circuit 372 in the second preceding column.

Referring now to the bottom row of AND circuits 366—370, it has already been mentioned that one of the two inputs of each of these AND circuits is provided by control line IIIS′. The other input for each of these AND circuits is provided by the binary one output of the secondary storage element in the same vertical column, for example, the second input of AND circuit 367 is provided by the binary one output of the secondary storage element $SB_4$. The output of each of these AND circuits 366—370 is connected through one of the lines 396—400 through the binary one input of the primary storage element in the same vertical column, for example, the output of AND circuit 367 connects through line 397 to the binary one input of primary storage element $SB_3$. The binary zero inputs of the primary storage elements $SA_3$—$SE_3$ are supplied from control line IVS′. The binary zero inputs of the secondary storage elments $SA_4$—$SE_4$ are provided by the control VS′.

It is believed that the functions of the several elements and connections just described may best be understood by considering specific examples of the operation of the subtract ring 100′. Assume, for the purposes of these examples, that pulses are applied to the control line IIS′—VS′ in the same sequence that pulses are applied to the corresponding control ines of the add ring 50.

For a first example, assume that the elements $SC_3$ and $SD_3$ are conditioned in the binary one state to represent the decimal digit 6. Operation of a ring 100′ is initiated by applying a pulse to control line VS′ to reset the secondary storage elements $SA_4$—$SE_4$. Following this, a pulse is applied to control line IIS′ to gate the binary ones in primary storage elements $SC_3$ and $SD_3$ to the proper secondary storage elements. At the time of application of control pulse IIS′ the binary one output lines 383, 383a, 384 and 384a are energized. Examination of FIGURE 8 will show that of all the AND circuits connected to these lines, only AND circuit 363 will receive two inputs therefrom. These two inputs, in combination with the input provided by control line IIS′, renders AND circuit 363 conductive to provide an output on line 394. This output passes via OR circuits 372 and 374 and via lines 377 and 379 to the binary one inputs of secondary storage elements $SB_4$ and $SD_4$, switching these elements to the binary one state.

Control line IVS′ is next pulsed to reset the primary storage elements. Following this a pulse is applied to control line IIIS′ to transfer the binary ones in secondary storage elements $SB_4$ and $SD_4$ to their corresponding primary storage elements. Upon application of this control pulse, AND gates 367 and 369 are opened to transmit signals over lines 397 and 399 to the binary one inputs of primary storage elements $SB_3$ and $SD_3$, switching these elements to the binary one state. The conditions of the primary storage elements now represent the decimal digit 5 so that subtraction of one unit from a decimal digit 6 has taken place.

For a second example of the operation of the ring 100′ assume that a second series of control pulses is applied to reduce the value of the digit stored in the ring 100′ from 5 to 4. First the reset pulse VS′ is applied to reset the secondary storage elements. Next a pulse is applied to control line IIS′ to gate the binary ones from primary storage elements $SB_3$ and $SD_3$ to the proper secondary storage elements. At the time this control pulse is applied lines 382, 382a, 384 and 384a are energized. Examination of FIGURE 8 will show that of all the AND circuits connected to these lines only AND circuit 358 receives two inputs one from line 382a and the other from line 384. These inputs in combination with control pulse IIS render AND circuit 358 conductive to transmit an output over line 389 to each of OR circuits 372 and 373 and thence via lines 377 and 378 to the binary one input of secondary storage elements $SB_4$ and $SC_4$ to switch these elements to the binary one state.

When secondary storage elements $SB_4$ and $SC_4$ have been set, a pulse may be applied to control line IVS′ to reset the primary storage elements. Following this line IIIS may be energized to gate the binary ones from the secondary storage elements SB₄ and SC₄ through AND circuits and 367 and 368 and over lines 397 and 398 to primary storage elements SB₃ and SC₃. At the end of this operation the states of the primary storage elements indicate the presence of the decimal digit 4, one unit less in value than the decimal digit 5 stored in the ring 100′ at the beginning of the advancing operation just described. It will be appreciated that addition with single unit stepping rings such as the ring 100′ is considerably more time consuming than operation with the rings 50 and 100.

Figure 9:
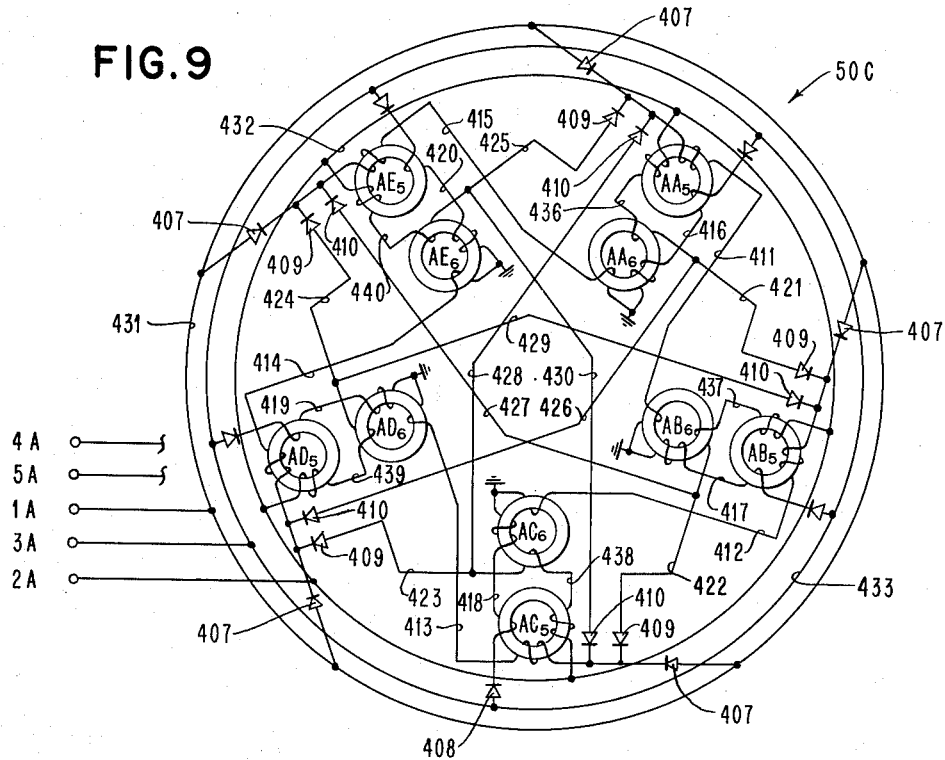
FIGURE 9 illustrates an embodiment of an add ring provided in accordance with the invention but employing magnetic cores as storage elements.
Figure 10:
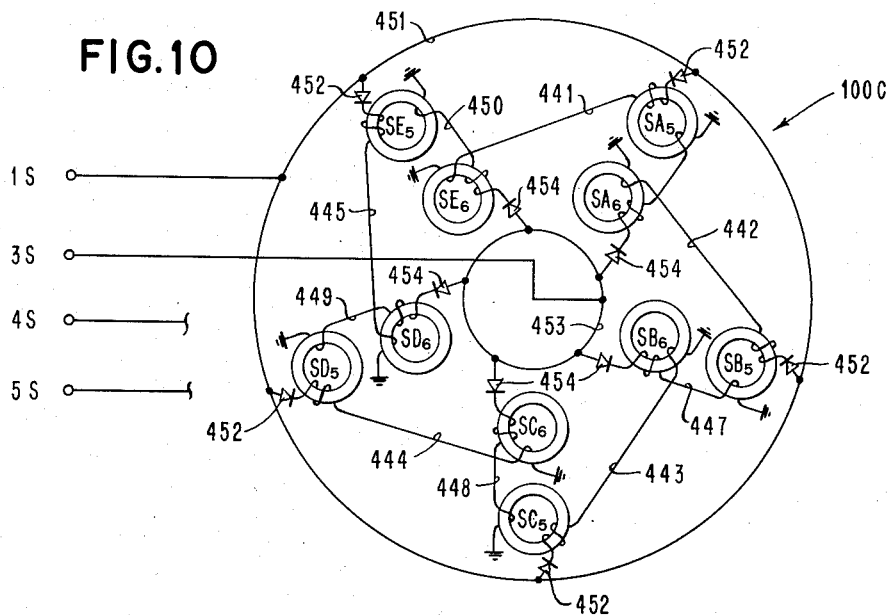
FIGURE 10 illustrates an embodiment of a subtract ring employing magnetic cores as storage elements.

FIGURES 9 and 10

In FIGURES 9 and 10 of the drawings there are shown embodiments of add and subtract rings 50C and 100C which employ bistable magnetic cores as primary and secondary storage elements in place of the flip flops used in the rings 50 and 100. Magnetic cores of the type exhibiting substantial magnetic remanence are inherently bistable in that they may be magnetized in either of two opposite directions and will remain so magnetized indefinitely. Such cores are therefore readily adaptable as storage elements in ring arrangements of the type herein involved.

FIGURE 9 shows an add ring 50C which employs five primary storage elements $AA_5$, $AB_5$, $AD_5$ and $AE_5$ represented as magnetic cores. Since the ring 50C is a closed ring, it is convenient to show the cores arranged in a circle. To each of these magnetic cores there corresponds a secondary storage element $AA_6$, $AB_6$, $AC_6$, $AD_6$, and $AE_6$ respectively, also represented as a magnetic core. There corresponds to each of the cores $AA_5$—$AE_5$ a coupling wire 411, 412, 413, 414 and 415, respectively, which is coupled relatively strongly with the corresponding primary core and relatively weakly with the secondary core corresponding to the first succeeding primary core. For example, wire 411 is coupled to the primary core $AA_5$ and to the secondary core $AB_6$, the coupling with core $AA_5$ being stronger than the coupling with core $AB_6$. Each one of these conductors 411—415 is connected through a diode 407 to a wire 431 at one end and to ground at the other end. The diodes 407 are poled to pass current from the wire of 431 to ground. The sense of the couplings of the wires 411—415 with the associated magnetic cores is in each case, such as to establish a clockwise flux direction in the associated cores. A core having flux oriented in the clockwise direction will hereinafter be referred to as being in the binary one state.

A second group of conductors 416, 417, 418, 419 and 420 are provided in the add ring 50C. Each of the conductors of this second group is coupled relatively weakly with one of the primary storage cores $AA_5$—$AE_5$ and relatively strongly with the corresponding secondary cores $AA_6$—$AE_6$. For example, conductor 416 is connected relatively weakly with primary storage core $AA_5$ and relatively strongly with secondary storage core $AA_6$. The other conductors 417—420 are connected in an analogous manner. The sense of the couplings of the conductors 416—420 with the associated cores is in each case such as to establish a clockwise flux direction. Each of the conductors 416—420 is connected through a diode 408 to a wire 433 at one end and to ground at the other end.

A third group of conductors 436, 437, 438, 439 and 440 are provided, each of which is connected relatively strongly with the primary storage cores $AA_5$—$AE_5$ and and relatively weakly with the corresponding secondary cores $AA_6$—$AE_6$. For example, conductor 436 is connected relatively strongly with the primary storage core $AA_5$ and relatively weakly with the secondary storage core $AA_6$. The other conductors 437—440 are connected in analogous manner. The sense of the couplings of the conductors 436—440 with the associated cores is in each case such as to establish a clockwise direction in the cores. Each of the conductors 436—440 is connected at one end to a wire 432 and at the other end to each of two separate wires. The two groups of wires to which conductors 436—440 are connected are numbered 421—425 and 426—430, respectively. Each of the wires 421—425 connects one of the conductors 436—440 to one of the conductors 411—415 and each of the wires 426—430 connects one of the conductors 436—440 to a different one of the conductors 411—415. For example, the conductor 436 is connected via wire 421 to the conductor 412 and via wire 426 to the conductor 414. The other conductors 437—440 are connected in an analogous manner. Each of the wires 421—425 has a diode 409 therein poled to pass current from the associated wire 421—425 to the conductor 411—415. Each of the wires 426—430 also has a diode 410 therein poled to pass current from the associated wire 426—430 to the conductor 411—415.

Before going into the details of the operation of the ring 50C the construction of the subtract ring 100C will be described. This ring, shown in FIGURE 10, comprises five primary storage cores $SA_5$—$SE_5$ and five secondary storage cores $SA_6$—$SE_6$ arranged in a circular pattern corresponding to that shown in FIGURE 9. Since the subtract ring 100C is only required to step in units of 2 digits its construction is substantially more simple than the construction of the ring 50C. Only two sets of coupling conductors are provided. The first set of conductors are designated by the reference numerals 441, 442, 443, 444 and 445. Each of these conductors is coupled relatively strongly with one of the primary storage cores $SA_5$—$SE_5$ and relatively weakly with the secondary storage core corresponding to the next preceding storage core. For example, conductor 441 is coupled relatively strongly with primary storage core $SA_5$ and relatively weakly with secondary storage core $SE_6$. The other conductors 442—445 are connected in an analogous manner. Each of the conductors 441—445 is connected through a diode 452 to a line 451 at one end and to ground at the other end. The diodes 452 are poled to pass current from the line 451 to ground.

The second group of conductors are identified by the reference numerals 446, 447, 448, 449 and 450. Each of the conductors 446—450 is connected relatively weakly with one of the primary storage cores $SA_5$—$SE_5$ and relatively strongly with the corresponding secondary storage core. For example, conductor 446 is coupled relatively weakly with primary storage core $SA_5$ and relatively strongly with secondary storage core $SA_6$. The other conductors 447—450 are connected in an analogous manner. Each of the conductors 446—450 is connected through a diode 454 to a line 453 at one end and to ground at the other end.

In describing the ring 50C and 100C the connections of the various conductors with the several storage cores have been characterized as "couplings" which are either "relatively strong" or "relatively weak." It will be understood that a "coupling" as the term is used herein, means a magnetic coupling obtained by winding a conductor through or around a core. "Relatively strong" and "relatively weak" couplings are obtained by adjusting the number of turns of the conductors through the cores. In FIGURES 9 and 10, a strong coupling is represented by two turns in a conductor and a weak coupling is represented by a single turn. Before describing the operation of the rings 50C and 100C some explanation of the operation of magnetic cores will be made. The cores are switched from one state to another by applying current pulses to the conductors coupled therewith. It is known that the speed of switching of a magnetic core in response to application of current to a winding coupled thereto is dependent upon the number of turns of the winding. In the relatively low switching speed range, the speed varies in inverse proportion to the number of turns, while the higher switching speed range, it varies in inverse proportion to the square of the number of turns. When two cores having windings of different numbers of the turns are connected in series and current is applied, the core having the higher number of winding turns will be switched first and the other will be switched thereafter. Switching speed is also directly proportional to the amount of current applied to a winding, so that a core having a winding which carries high current will switch before a core having a winding which carries low current. It is also known that when current is passed through a winding on the core in a direction to change the state of the core, then the winding represents a high impedance to current flow. However, when current is passed through a winding in a direction to drive the core to the state it already occupies, the winding represents a very low impedance to current flow. This property is employed in the rings 50C and 100C to "steer" current through desired current paths to effect transfers of information between selected storage cores. It is believed that the way in which this is accomplished may be clearly understood by considering examples of the operation of the rings 50C and 100C.

The rings 50C and 100C are operated by applying control pulses thereto in the same manner as described with reference to the rings 50 and 100 of FIGURES 4 and 5. The control lines over which the pulses are transmitted are identified in FIGURES 9 and 10 by the reference 1A—5A and 1S—5S, respectively. The functions performed by these lines correspond to the functions performed by lines IA—VA and IS—VS of FIGURE 4 and 5. Pulses are applied to the control lines 1A—5A and 1S—5S in the same order and at the same relative time as were pulses applied to the corresponding control lines in FIGURES 4 and 5. It will be noted that the lines 4A and 5A of FIGURE 9 are broken before entering the ring 50C, the corresponding lines 4S and 5S are also broken before entering the ring 100C of FIGURE 10. The functions of lines 4A and 4S to reset the primary storage cores of their respective rings and functions of the lines 5A and 5S are to reset the secondary storage cores of their respective rings. These lines are each accordingly coupled by windings to all of the cores that they are intended to reset. The windings have been omitted in FIGURES 9 and 10 for the sake of clarity. The manner in which these windings are threaded may be seen in FIGURES 11 and 12, described later.

The rings 50C and 100C are operated with the same code as the rings 50 and 100. Addition is performed in exactly the same manner, that is, by counting the add ring 50C up and by counting the subtract ring 100C down. During each step of an addition operation, the decimal digit stored in the add ring 50C is increased by two units and the decimal digit stored in the subtract ring 100C is decreased by two units. This process is continued until the value of the digit stored in the subtract ring 100C reaches either the decimal value of 1 or 0. If a decimal value of 1 is reached, a modified advancing step is performed in the add ring 50C to increase the value of the digit stored therein by one unit, afterwhich the addition is completed. If the decimal value of the digit stored in the subtract ring 100C reaches 0, then no additional modified advancing step need be carried out.

For a first example of the operation of the rings 50C and 100C let it be assumed that the addition of 4+3=7 is to be formed. The decimal digit 4 is inserted in the add ring 50C by switching the primary storage cores $AB_5$ and $AC_5$ to the binary one state by suitable digit entry windings (not shown). The decimal digit 3 is inserted in the subtract ring 100C by switching the primary storage cores $SA_5$ and $SC_5$ to the binary one state by means of suitable digit entry windings (not shown). All other cores in both rings are reset to the binary zero state. Addition is commenced by performing a normal advancing step in each of the rings 50C and 100C. It will be recalled that with the rings 50 and 100 of FIGURES 4 and 5, a normal advancing step was carried out by applying current pulses to control lines IA and IS, IVA and IVS, IIIA and IIIS, and IVA and IVS. The same sequence of pulses is applied to the control lines 1A, 1S, 4A, 4S, 3A, 3S, 5A and 5S of FIGURES 9 and 10.

The control line 1A is connected to the wire 431 of the ring 50C. Application of a pulse to this line causes each of the conductors 411—415 to carry current in a direction to switch the cores coupled thereto to the binary one state. Since all cores except cores $AB_5$ and $AC_5$ are in the binary zero state, each of the conductors 411, 414 and 415 present a high impedance to current flow. Conductors 412 and 413, however, present a significantly lower impedance since the cores $AB_5$ and $AC_5$ are already in the binary one state and their windings each present practically a short circuit. Conductors 412 and 413 will therefore carry a higher current than the other conductors and secondary storage cores $AC_6$ and $AD_6$ will be switched to the binary one state before any other cores of the ring are affected. Assuming that the duration of the current pulse on line 1A is limited, the switching of cores $AC_6$ and $AD_6$ will be the sole result of the control pulse. The duration of this control pulse and also that of control pulses 1S, 3A and 3S may be limited to provide this result by employing blocking oscillators such as the one shown in FIGURE 15 as pulse sources. By proper selection of circuit parameters, the block oscillator source may be made to supply a pulse of a duration only long enough to cause switching of the cores along the low impedance current paths.

The control line 1S is connected to the wire 451 of the ring 100C. Application of a pulse to this line causes each of the conductors 441—445 to carry current in the direction to drive the cores coupled thereto to the binary one state. Since all cores except cores $SA_5$ and $SC_5$ are in the binary zero state, each of the conductors 442, 444 and 445 present a high impedance to current flow. Conductors 441 and 443, however, present a significantly lower impedance to current flow since the cores $SA_5$ and $SC_5$ to which they are coupled, are already in the binary one state and their windings reflect a very low impedance. Conductors 441 and 443 will therefore carry a higher current than the other conductors and secondary storage cores $SB_4$ and $SE_4$, coupled to these conductors, will be switched to the binary one state before any other cores of the ring are affected. Assuming that the control pulse 1S is limited in the same manner as the control pulse 1A, no other cores will be switched.

Following the coincident application of pulses to the control lines 1A and 1S, reset pulses are applied to the control lines 4A and 4S to reset the primary storage cores $AB_5$ and $AC_5$ of the add ring 50C and primary storage cores $SA_5$ and $SC_5$ in the subtract ring 100C. Upon completion of this operation, pulses are applied to control lines 3A and 3S. Control line 3A is connected to the wire 433 of the add ring 50C. This pulse will cause current to flow in the conductors 416—420 which extend from the line 433 to ground. For this pulse, the paths of easy resistance are through conductors 418 and 419 since secondary storage cores $AC_6$ and $AD_6$ are already in the binary one state. Primary storage cores $AC_5$ and $AD_5$, coupled to conductors 418 and 419, respectively, will therefore be switched to the one state as a result of pulse 3A. The pulse applied to control line 3S of the subtract ring 100C passes via line 453 to each of conductors 446—450. Since secondary storage cores $SB_6$ and $SE_6$ are in the binary one state, the paths of least resistance to the pulse on line 453 are through conductors 447 and 450. Current flow through these conductors sets primary storage elements $SB_5$ and $SE_5$ to the binary one state.

Following the pulse on line 3A and 3S there is applied a pulse to each of lines 5A and 5S to reset the secondary storage cores of the add ring 50C and the subtract ring 100C.

At the end of the first advancing operation the primary storage cores $AC_5$ and $AD_5$ of the add ring 50C are in the binary one state to represent the decimal digit 6 and the primary storage elements $SB_5$ and $SE_5$ of the subtract 100C are in the binary one state to represent the decimal 1. To complete the addition it is now necessary to step the ring 50C by one unit to add thereto the decimal value of 1 which is presently stored in the subtract ring 100C. It will be recalled that a modified advancing operation was carried out in the ring 50 of FIGURE 4 by applying thereto pulses on control lines IIA, IVA, IIIA, and VA. No pulses were applied to the subtract ring 100. A correspondence of control pulses is applied to control lines 2A, 4A, 3A, and 5A of the ring 50C to perform the modified advancing operation. Reference to FIGURE 9 will show that control line 2A is connected to the wire 432 of the ring 50C. Application of a pulse to this line causes current to flow in each of the conductors 436—440. Since the primary storage cores $AC_5$ and $AB_5$ are in the binary one state and all other primary and secondary cores are in the binary zero state, the current path comprising conductor 438, 423 and 414 will be the path of least resistance from the wire 432 to ground. This current path includes the relatively strong coupling windings of both primary storage cores $AC_5$ and $AD_5$ which are in the binary one state and reflect substantially no impedance. Examination of FIGURE 9 will show that there is no other current path from wire 432 to ground which does not include at least one strong coupling winding with a magnetic core in the binary zero state. Current flow in the path comprising conductor 438, conductor 423 and conductor 414 will cause secondary storage elements $AC_5$ and $AE_5$ to be switched to the binary one state.

Following pulse 2A, a control pulse is applied to control line 4A to reset the primary storage elements $AC_5$ and $AB_5$. When this has been accomplished, a control pulse is applied to line 3A which connects to wire 433. A pulse on this line causes current to flow in each of the conductors 416—420. Since secondary storage elements $AC_6$ and $AE_6$ are in the binary one state, conductors 418 and 420 will provide the paths of least resistance from wire 433 to ground, causing primary storage elements $AC_5$ and $AE_5$ to be switched to the binary one state. When they have been so switched, a pulse may be applied to reset line 5A to reset the secondary storage elements $AC_6$ and $AE_6$ upon which the operation may be considered completed. Reference to the diagram of FIGURE 3 will show that binary ones and the storage cores $AC_5$ and $AE_5$ represent the decimal digit 7, one unit greater in value than the decimal digit 6 stored in the ring 50C immediately prior to the modified operation.

It is believed that the foregoing explanation adequately describes, the operation of the subtract ring 100C and the operation of the add ring 50C in the case where steps of two units are performed and in the case where a step of one unit is performed to increase the value of an even digit by one. For a complete understanding of the operation of the add ring 50C consideration should be made of the case where a modified advancing operation is carried out when the ring 50C has stored therein an odd number, for example, the decimal digit 7. A decimal digit 7 is represented in the ring 50C by binary ones stored in primary storage cores $AC_5$ and $AE_5$. Under these circumstances, a pulse applied to control line 2A will find the low resistance path to exist through conductors 440, 430 and 413. Current flow along this path will cause the secondary storage elements $AE_6$ and $AD_6$ to be switched to the binary one state. Thereafter, upon application of a control pulse 3A the low resistance paths through conductors 419 and 420 will transfer the binary ones from secondary storage elements $AE_6$ and $AD_6$ to primary storage elements $AE_5$ and $AD_5$ respectively, so that the decimal digit 8 is represented.

It will be observed from the foregoing that with the circuits shown in FIGURES 9 and 10 each switching operation performed in response to a pulse applied to any of the control lines 1A, 2A, 3A and 3S causes two magnetic cores to be switched. This provides the advantage that the amount of current necessary in each switching step is always constant. The use of the circuits shown in FIGURES 9 and 10 in connection with the code shown in FIGURES 2 and 3, thus offers the advantage of a constant current consumption. This simplifies the design of auxiliary parts and is a desirable feature as far as power supply is concerned. In addition, this arrangement provides a simple means of error detection in that an increase or decrease in switching current indicates a false symbol representation.

Figure 11:
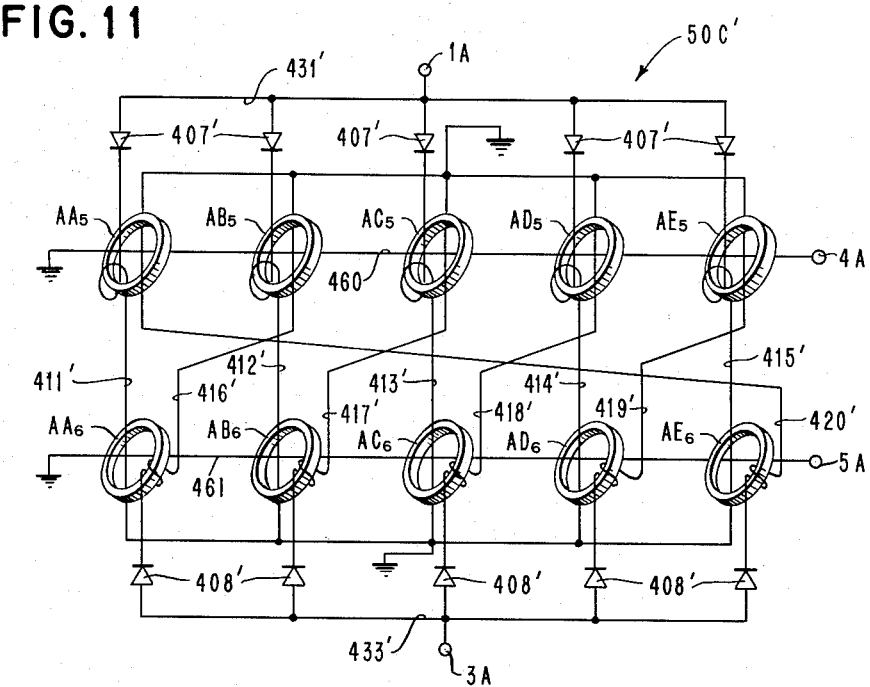
FIGURES 11, 12, 13 and 14 illustrate modified wiring arrangements for the magnetic core ring circuits of FIGURES 9 and 10.
Figure 12:
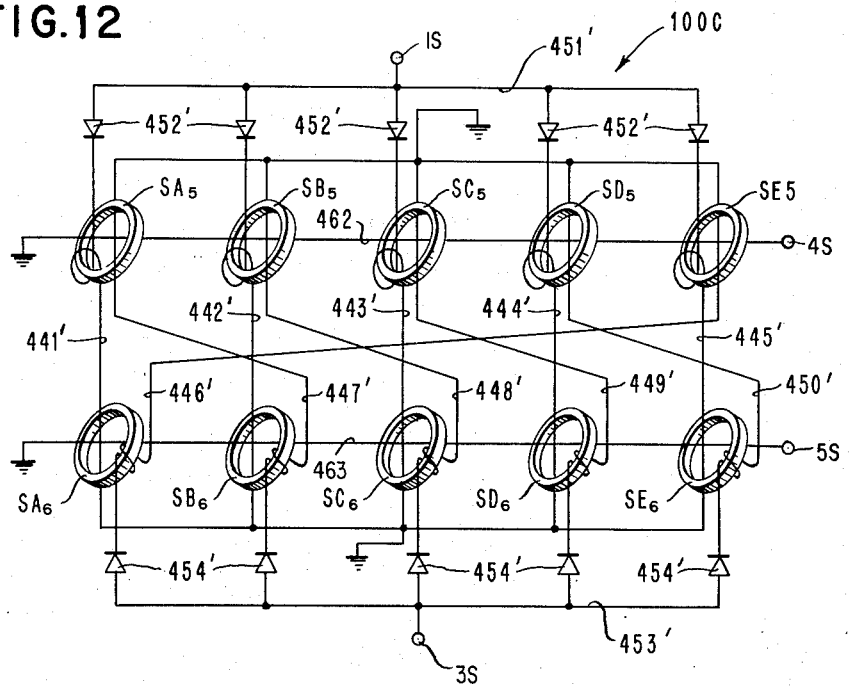

*FIGURES 11 and 12*

Referring to the details of construction of the rings 50C and 100C again for a moment, it will be noted that the conductors which are employed for carrying out a normal advancing operation which changes the value of the digits stored in the rings by two units, are arranged so that a binary one stored in a given primary storage core is transmitted to the secondary storage core of the next register position (the next succeeding register position in the case of the ring 50C and the next preceding position in the case of the ring 100C) and from that secondary storage core to its corresponding primary storage core. In FIGURES 11 and 12 there are shown modified wiring arrangements from rings 50C' and 100C' wherein binary ones are transferred from given primary storage cores to the next adjacent primary storage cores over a somewhat different route.

FIGURE 11 shows a modified wiring arrangement for the add ring 50C'. Only the conductors and control lines for normal advancing operations are shown in this figure. The necessary conductors for performing modified advancing operations may be provided in accordance with the arrangement shown in FIGURE 9. Referring to the details of FIGURE 11, there are shown the five primary storage cores $AA_5$—$AE_5$ and the five secondary cores $AA_6$—$AE_6$ of the ring 50C. While these cores are arranged in rows rather than in concentric circles as in FIGURE 9, it will be understood that they represent the same ring arrangement. The control line 1A is shown as entering the ring from the top of the figure. As in FIGURE 9 the line 1A connects with a wire 431' to which are connected several paralleled conductors 411'—415'. Each conductor 411'—415' has a diode 407' therein poled to pass current from the wire 431' to ground. Each of the conductors 411'—415' is coupled relatively strongly with one of the primary storage cores, then relatively weakly with the corresponding secondary storage core, and then to ground. For example, conductor 411' is coupled relatively strongly with core $AA_5$ and relatively weakly with core $AA_6$. The other conductors 412'—415' are connected in an analogous manner.

The control line 3A is shown as entering the ring of FIGURE 11 from the bottom. As in FIGURE 9, the line 3A connects with a wire 433' to which are connected several paralleled conductors 416'—420' leading to ground through diodes 408'. With the arrangement shown in FIGURE 11, each of the conductors 416'—420' is coupled relatively strongly with one of the secondary storage cores and relatively weakly with the primary storage core of the next following register position. For example, conductor 416' is coupled relatively strongly with secondary storage core $AA_6$ and relatively weakly with primary storage core $AB_5$.

With the construction just described, a binary one stored in a given primary storage core is transferred, in response to a pulse 1A, to the corresponding secondary storage core and then in response to a control pulse 3A, to the primary storage core of the next following register position. It will be seen that while the method of transfer is the same as that employed in the ring of FIGURE 9 and while the result of the transfer is also the same, the route is somewhat different.

In FIGURE 11 are also shown reset wires 460 and 461 coupled, respectively, with all of the primary storage cores $AA_5$—$AE_5$ and all of the secondary storage cores $AA_6$—$AE_6$. Each of these reset conductors 460 and 461 is coupled with its associated cores in a manner to drive the cores to the binary zero state, when energized. The wire 460 is connected to control line 4A and the wire 461 is connected to control line 5A. The functions of these control lines have already been described.

FIGURE 12 illustrates a modified wiring arrangement for the subtract ring 100C. There are shown in this figure, the five primary storage cores $SA_5$—$SE_5$ and the five secondary storage cores $SA_6$—$SE_6$ of the subtract ring 100C, again shown in horizontal rows. The control lines 1S and 3S, employed to shift information from core to core, are shown as entering the ring from the top and bottom, respectively, while the control lines 4S and 5S, employed to reset the primary and secondary cores, respectively, are shown as entering from the right side.

As in the case of the embodiment of FIGURE 10, the control line 1S connects with a wire 451' from which conductors 441'—445' extend to ground. Diodes 452' are interposed in the conductors 441'—445' to prevent current flow from ground to the conductor 451'. Each of the conductors 441'—445' is coupled relatively strongly with one of the primary cores $SA_5$—$SE_5$ and relatively weakly with the secondary storage core of the same register position. For example, conductor 441' is coupled relatively strongly with primary storage core $SA_5$ and relatively weakly with secondary core $SA_6$. The other conductors 442'—445' are connected in an analogous manner.

The control line 3S connects to a line 453' to which are coupled several paralleled conductors 446'—450' leading through 454' to ground. Each of the conductors 446'—450' is coupled relatively strongly with one of the secondary cores $SA_6$—$SE_6$ and relatively weakly with the primary storage core of the next preceding register position. For example, conductor 447' is coupled relatively strongly with secondary core $SB_6$ and relatively weakly with primary core $SA_5$.

The reset control lines 4S and 5S are connected to wires 462 and 463 respectively. Wire 462 is coupled to all of the primary storage cores $SA_5$—$SE_5$ of the ring 100C' in a manner to drive them to the zero state upon energization. Wire 463 is coupled to all of the secondary cores $SA_6$—$SE_6$ in an analogous manner.

The ring 100C' is operated by control pulses applied in the same manner as in the case of the ring 100C, with the same results. The difference in connection of the conductors 441'—445' and 446'—450' merely provides a different shifting route. Whereas a binary one stored in a given primary core of the ring 100C, for example core $SC_5$, was transferred first to the secondary core $SB_6$ of the first preceding register position and next the primary storage core $SB_5$ of the same register position, the connections in the ring 100C' cause a binary one stored in a given primary core, for example, core $SC_5$, to be shifted first to the corresponding secondary core $SC_6$ and next to the primary core $SB_5$ of the first preceding register position.

The construction shown in FIGURES 11 and 12 are exemplary of the various modifications which may be made in the add and subtract ring arrangements without departing from the spirit of the invention.

Figure 13:
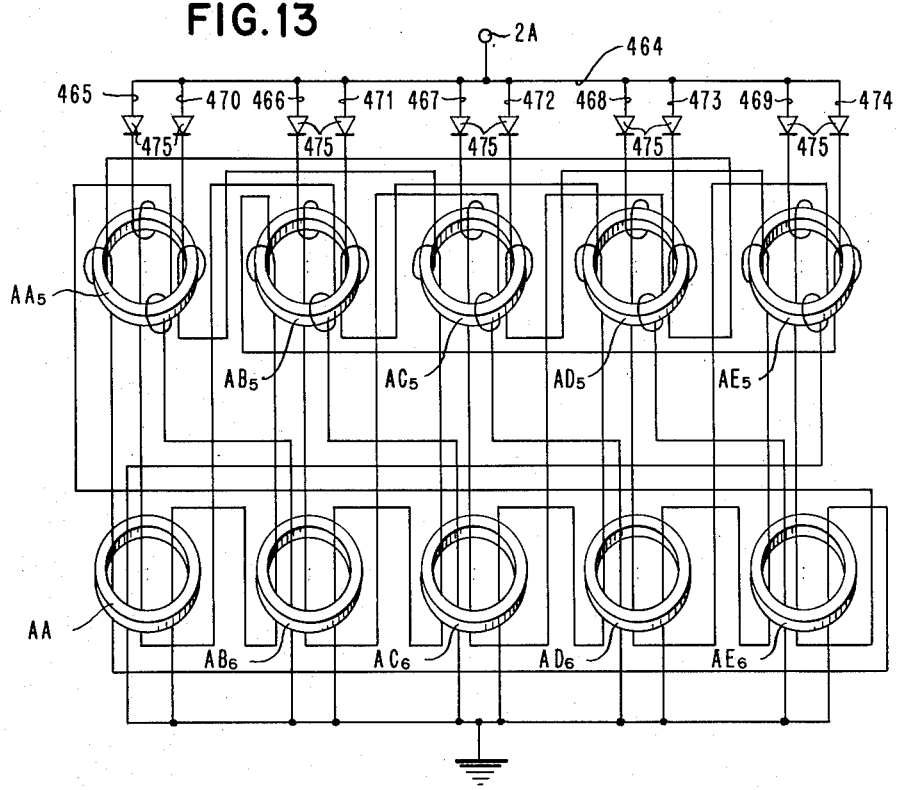
Figure 14:
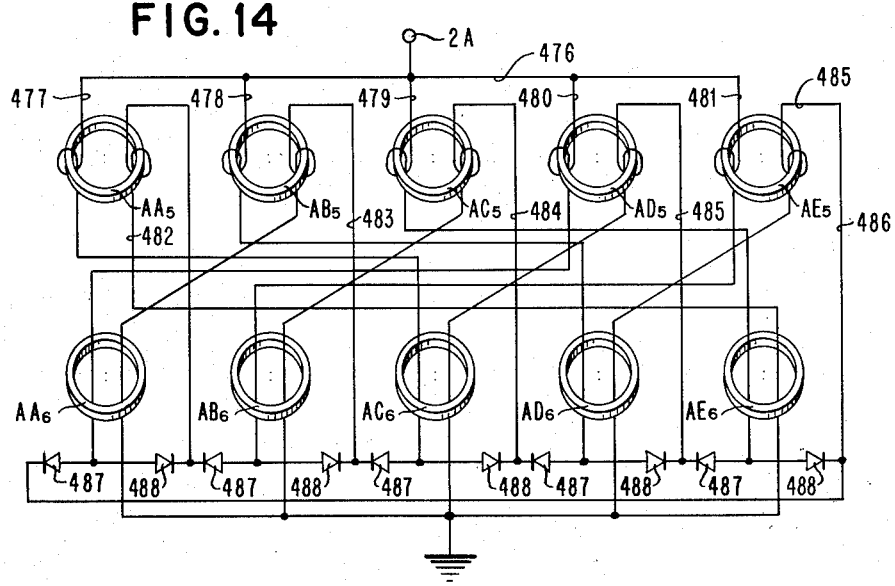

*Figures 13 and 14*

Further modifications of the wiring arrangement of the add ring are shown in FIGURES 13 and 14. Whereas the modification shown in FIGURE 11 provided an alternate transfer route for shifting binary ones during a normal shifting operation, the modifications shown in FIGURES 13 and 14 provide alternate transfer routes for shifting binary ones during modified, or advance-by-one-unit, shifting operations. For the sake of simplicity, only the conductors which respond to control pulses on line 2A, employed in single unit advancing operations, are shown in these figures.

Referring now to the details of FIGURE 13, there are shown the cores $AA_5$—$AE_5$ and $AA_6$—$AE_6$ of the add ring. Control line 2A is shown as entering the ring from the top, and as connecting to a common supply line 464. Also connected to line 464 are two groups of five conductors each, identified by the reference characters 465—469 and 470—474 respectively. These conductors are connected at their opposite ends to ground and each is provided with a diode 475 poled to pass current from the wire 464 to ground.

Each conductor of the group 465—469 is coupled to four different cores, two primary cores and two secondary cores, in a fixed combinational pattern. The pattern is arranged so that, following any one of the conductors 465—469 from the line 464 to ground, it connects first relatively strongly to a given primary core, then relatively weakly with the secondary core of the same register position, then relatively strongly with the primary core of the first succeeding register position and then relatively weakly with the secondary core of the second succeeding register position. For example, conductor 465 is coupled strongly with core $AA_5$, then weakly with core $AA_6$, then strongly with core $AB_5$, and then weakly with core $AC_6$. Conductors 466—469 are connected in an analogous manner. The couplings are such that current in the conductors 465—469 drives the cores to the binary one state.

Each conductor of the group 470—474 is also coupled to two primary cores and two secondary cores, although in a different fixed combinational pattern from that of the conductors 465—469. This second pattern is such that each conductor 470—474, in travelling from the wire 464 to ground is coupled first relatively strongly with a given primary core, then relatively strongly with the primary core of the second succeeding register position, then relatively weakly with the secondary core of said second succeeding register position, and then relatively weakly with the secondary core of the first succeeding register position. For example, conductor 470 is coupled relatively strongly with core $AA_5$, then relatively strongly with core $AC_5$, then relatively weakly wtih core $AC_6$, then relatively weakly with core $AB_6$. The other conductors 471—474 are connected in an analogous manner as may be seen in FIGURE 13. The couplings are such that current in conductors 470—474 drives the cores to the binary one state.

It will recalled that in each embodiment of the invention, the control line 2A is employed to transfer binary ones from primary storage elements to secondary storage elements in a manner to initiate a single unit advancing step. Such an advancing step is accomplished by moving one of the two binary ones forward one register position. Which one of the two bits is moved depends upon whether the number previously stored was odd or even. The arrangement shown in FIGURE 13 is contructed to take this into account. Assume, for example, that a decimal digit 4 is stored in the ring as represented by binary ones in cores $AB_5$ and $AC_5$, and that control line 2A is energized to initiate a single step advancing operation. Under these circumstances all of the ten conductors 465—474 will have current applied thereto. Since all primary cores save $AB_5$ and $AC_5$ are in the binary zero state, all conductors except conductor 466 will have at least one strong coupling to a primary core in the high impedance state. Conductor 466, however, is coupled to the two primary cores in the binary one, or low impedance state so the majority of the current will flow therethrough causing secondary cores $AB_6$ and $AD_6$ to be switched. Assuming that a control pulse 3A will transfer the ones from these secondary cores to their corresponding primary cores $AB_5$ and $AD_5$, the new digit represented will be the decimal digit 5, one unit greater than the 4 originally stored.

In the event that an odd digit is stored in the ring of FIGURE 13, at the time a pulse is applied to line 2A, one of the conductors of the group 470—474 will provide the low impedance path to ground. Assume, for example, that the decimal 5 is stored as represented by ones in cores $AB_5$ and $AD_5$. Examination of FIGURE 13 will show that the path of least resistance is through conductor 471 which couples strongly with both cores $AB_5$ and $AD_5$. Current flow in the conductor will switch secondary cores $AC_6$ and $AD_6$. Again assuming that a following pulse 3A transfers the ones from these secondary cores to their associated primary cores AC and $AD_5$, the new digit represented in the ring will be the decimal digit 6, one unit greater than the 5 originally stored.

The arrangement of FIGURE 14 is designed to produce the same results of that of FIGURE 13, although in a somewhat different manner. FIGURE 14 shows the primary and secondary cores in the same arrangement as in FIGURE 13, and again shows only the conductors associated with the control line 2A. In this arrangement the line 2A connects through a common wire 476 to five conductors 477—481, each of which is coupled relatively strongly with a given primary core and relatively weakly with the secondary core of the second succeeding register position. For example, conductor 477 is coupled strongly with core $AA_5$ and weakly with core $AC_6$. The conductors 478—481 are connected in an analogous manner. In addition to conductors 478—481, five other conductors 482—486 are provided. Each of these last named conductors is coupled relatively strongly with a given primary core and relatively weakly with the secondary core of the first preceding register position. For example, conductor 483 is coupled strongly with primary core $AB_5$ and weakly with secondary core $AA_6$.

The conductors 477—481 and the conductors 482—486 are interconnected to provide two kinds of paths from the wire 476 to ground. As shown in FIGURE 14, after coupling with a given secondary core, each conductor 477—481 connects, through a diode 487, to the conductor of the group 482—486 which couples strongly with the primary core of the first preceding register position. These connections provide current paths each of which couples to a given primary core then to the secondary core of the second succeeding register position, then to the primary core of the first succeeding register position and finally to the secondary core of the same register position. Considering the path formed by conductors 477 and 483, it couples with cores $AA_5$, $AC_6$, $AB_5$ and $AA_6$. There are four other similar paths through other combinations of cores. Comparison of FIGURES 13 and 14 will show that these paths, just described, each couple the same four cores (though not in identical sequence) as the conductors 465—469 in the arrangement of FIGURE 13.

In order to duplicate the paths provided by the conductors 470—474 of FIGURE 13, each of the conductors of the group 477—481 is connected, after coupling to a secondary core, through a diode 488 to the conductor of the primary core of group 482—486 which couples to the primary core of the same register position. This connection provides a plurality of paths, each of which couples strongly with a given primary core, then weakly with the secondary core of the second succeeding register position, then strongly with the primary core of said second succeeding register position, and finally weakly with the secondary core of the first succeeding register position. Considering the path formed by conductors 477 and 484, the path includes primary core $AA_5$, secondary core $AC_6$, primary core $AC_5$ and secondary core $AB_6$. This path is identical to that formed by conductor 470 of FIGURE 13.

It will be seen that the arrangement just described provides the exact equivalent of the arrangement of FIGURE 13, although with differently positioned conductors. Since this is true, it is not believed necessary to explain the details of operation of the circuit of FIGURE 14. The operation is the same as that described with reference to FIGURE 13.

The arrangements shown in FIGURES 13 and 14 are not intended as complete embodiments of add rings. To form a complete add ring using either of these arrangements, the circuit connections associated with control lines 1A, 3A, 4A and 5A of FIGURE 9 must be included.

COMPONENT CIRCUITS

The following are detailed descriptions of component circuits including a blocking oscillator, a standard flip flop circuit, and standard AND, OR and INVERTER circuits which have been referred to hereinbefore, and some of which are shown in the drawings in symbolic block form. It should be understood that these circuits are given only as examples of circuits which may be employed for the purposes described and that they are not to be considered as limiting the invention.

FIGURE 15

Figure 15:
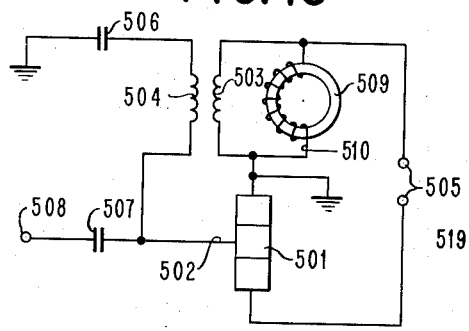
FIGURE 15 illustrates a blocking oscillator suitable for use with the rings of FIGURES 9 through 14.

FIGURE 15 shows an example of a blocking oscillator such as might be employed in the drive circuits for the control lines 1A, 1S, 2A, 2S, 3A and 3S of the add and subtract ring embodiments employing magnetic cores. The oscillator comprises a transistor 501 having a base electrode 502. An inductance coil 503 is connected in series with one terminal of the transistor 501. The terminal to which inductance coil 503 is connected is also grounded as shown by the conventional symbol in FIGURE 15. The primary coil 503 is magnetically coupled with a secondary coil 504. To the other end of the coil 503 and to the transistor 501 there are connected the terminals 505 of a current source. The winding 510 coupled with the core 509 is arranged in parallel with the coil 503. One end of the coil 504 is coupled over a condenser 506 to ground, the other end of the coil 504 is connected to the base electrode 502 of transistor 501. Also coupled to the base electrode is an input terminal 508 across the capacitor 507.

In order to explain the operation of this device, let it be assumed that the oscillator of FIGURE 15 is blocked, which means that the transistor 501 is not conducting. From input terminal 508 there may now be applied, across the condenser 507, an input pulse, which triggers the oscillator into operation by rendering the transistor 501 conducting. This causes the voltage applied at terminals 505, which appeared across the transistor 501 during the blocked period, to appear now across the coil 503, because the transistor 501 now forms practically a short circuit. The current flowing through the coil 503 is fed back through coil 504 to the base 502 of the transistor 501 with such polarity that conduction of transistor 501 is enhanced. The voltage drop appearing across coil 503 causes a current to flow through the coupling winding 510 of the core 509. Upon saturation of the core 509, the coupling 510 represents practically a short circuit so that the voltage across coil 503 breaks down. This breaking down of the voltage appears also on the secondary coil 504 causing the base electrode voltage to vary in a direction as to block the current conduction of transistor 501 so that the pulse which appeared across 503 and which was applied to the core winding 510, discontinues as soon as the core 509 has switched to the binary one state.

To establish the relation of FIGURE 15 with the circuit of FIGURE 9, for example, the winding 510 corresponds to or represents a coil or a plurality of analogous coils like the coils 411–415, for example, coupled to the primary and secondary elements, and the core 509 corresponds to or represents a primary and secondary core or a plurality of analogous primary and secondary cores coupled together like the cores $AA_5$—$AE_5$ and $AA_6$—$AE_6$ for instance. Thus the oscillator of FIGURE 15 may supply any one of the input conductors 431, 432, 433, 451, or 453. As soon as the desired cores have switched the current through the windings on these cores increases rapidly and operation of the blocking oscillator is blocked so that a switching of undesired cores is prevented. The oscillator remains blocked until triggered on again by the next pulse applied to terminal 508.

FIGURE 16

FIGURE 16 illustrates a standard flip flop circuit together with the block symbol used herein to represent such a circuit. Referring to the details of FIGURE 16, there are shown two triode tubes 511 and 512 (transistors may be used, if desired) having their anodes connected through resistors 513 and 514 to a suitable source of positive potential and having their cathodes connected to ground. The control grids of tubes 511 and 512 are connected through resistors 515 and 516 to a negative bias source suitable for maintaining the tubes in a cut-off state, and are also connected through capacitors 517 and 518 to input lines 519 and 520. In addition, the grid of each tube is cross-coupled to the anode of the other tube. Resistor 521 and capacitor 522 couple the grid of tube 511 to the anode of tube 512, while resistor 523 and capacitor 524 couple the grid of tube 512 to the anode of tube 511. An output line 525 is connected to the anode of tube 511 and an output line 526 is connected to the anode of tube 512.

The circuit just described is bistable in nature. A stable state is represented by one of the two tubes being in a conductive state and the other being in a non-conductive state. The state of the flip flop may be reversed by applying a negative signal to one of the input lines 519 or 520. For example, let it be assumed that the tube 511 is initially in a conductive state. In this case, tube 511 represents a substantially short circuit and its anode potential is low. The low anode potential is applied to the grid of tube 512 through the coupling circuit including resistor 523 and capacitor 524 holds tube 512 in a cut-off condition, so that the anode potential thereof is high. This high anode potential of tube 512 is applied to the grid of the tube 511 through the coupling circuit including resistor 521 and capacitor 522 to maintain tube 511 in a conductive state. It will be seen that this condition is stable. This stable state is characterized by a high level output on line 526 and a low level output on line 525. In order to reverse the state of the flip flop, a negative pulse is applied to input terminal 519 and through capacitor 517 to the grid of tube 511. The negative pulse will cause the potential of the grid tube 511 to suddenly drop so that the amount of current flowing in the tube decreases. This causes the anode potential of tube 511 to increase. The increase in anode potential is applied to the grid of tube 512 so that this tube now starts to conduct. As current flow is established in tube 512, its anode potential decreases. The drop of anode potential of tube 512 is applied to the grid of tube 511 to reduce the grid potential and render tube 511 non-conductive. The flip flop is now in its second stable state, characterized by a high level signal on output line 525 and a low level signal on output line 526.

It will be understood that the flip flop circuit may be switched from one stable state to the other by applying a negative pulse as described, or, in the alternative, by applying a positive signal to the opposite input line. For example, the reversal described above could have been initiated by applying a positive signal to the input line 520 and through capacitor 518 to the grid of tube 512.

FIGURE 17

FIGURE 17 shows an example of a standard AND circuit and the block symbol used herein to represent such a circuit. Referring to the details of FIGURE 17, there are shown three diodes 527, 528 and 529 having their cathodes connected to three input lines 530, 531 and 532 and having their anodes connected through a load resistor 533 to a source of positive potential. An output line 534 is also connected to the anodes of the several diodes. With this arrangement, current flow through any one of the diodes 527—529 will cause a voltage drop to appear across resistor 533. When such current flow exists, the output line 534 will be at a relatively low signal level. If, however, all three of the diodes 527—529 are back biased by application of positive signals to the input lines 530—532, current flow will cease and output line 534 will rise to substantially the level of the positive voltage source. A positive signal is observed on output line 534 only when positive signals are applied to each of the input lines, hence, a conjunctive function is obtained.

FIGURE 18

FIGURE 18 illustrates an example of the standard OR circuit together with the block symbol used herein to represent such a circuit. Referring to the details of FIGURE 17, there are shown three diodes 535, 536 and 537, the anodes of which are connected to the input lines 538, 539 and 540. The cathodes of diodes 535—537 are connected in common through a load resistor 541 to a source of negative potential. An output line 542 is also connected to the cathodes of diodes 535—537. With this arragement, the output line 542 will remain at substantially the level of the negative voltage source when no signal is applied to any input lines 538—540. If, however, any one of the input lines has a positive signal applied thereto, the associated diode will be forward biased and current will flow through the resistor 541 to the negative voltage source, producing a voltage drop positive at the upper end of resistor 541 and thereby raising the level of the output line 542. Since an input on any of the input lines provides an output signal, the disjunctive function is obtained.

FIGURE 19

Figure 19:
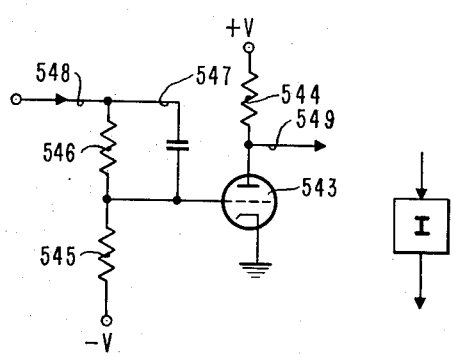
FIGURE 19 illustrates a standard INVERTER circuit suitable for use in the circuits of FIGURES 4, 5, 6 and 8 together with the block symbol used to represent the INVERTER circuit.

FIGURE 19 illustrates an example of the standard INVERTER circuit together with a block symbol used herein to represent such a circuit. Referring to the details of FIGURE 19, there is shown a triode 543 having its anode connected through a resistor 544 to a source of positive potential and having its cathode connected to ground. The grid of tube 543 is connected through a resistor 545 to a negative bias source and through a resistor 546 and capacitor 547 to an input line 548. An output line 549 is connected to the anode of tube 543.

To understand the operation of this circuit, let it be assumed that in the absence of input pulse the negative bias potential is sufficient to maintain tube 543 in a cut-off condition. When the tube is cut off, the anode potential is high and a relatively high level signal is applied to output line 549. When a positive signal is applied on the input line 548, the tube is rendered conductive and its anode potential decreases, thereby reducing the signal level on output line 549. The INVERTER thus supplies an output when no input is present and ceases to supply an output when a positive input is applied.

SUMMARY

It is believed apparent from the foregoing description, read in connection with the accompanying drawings, that the present invention provides an arithmetic system which is more economical than the known systems mentioned earlier herein and yet is fast and reliable. The arrangement for combining numbers by coincidently altering their values by equal amounts is adaptable to any number system and permits direct arithmetical combination of numbers at electronic speeds without the necessity of converting to a binary number system or a binary coded number system as in many presently known arithmetic systems. The arrangement for altering the values of the numbers to be combined in steps of more than one unit materially enhances the operational speed of the system without unduly increasing its complexity.

It should also be pointed out that while the invention has been shown and described with reference to the "walking" code of FIGURES 2 and 3, it is not restricted thereto. Other codes may be employed, provided the add and subtract ring arrangements are modified to operate in accordance therewith.

The specific embodiments of the invention shown and described herein have all been related to an addition system. It will be apparent to the skilled in the art, however, that a subtraction system may be readily provided in accordance with the teaching hereof. For example, subtraction may be performed with the system of FIGURE 1 in accordance with a known scheme of complementary addition. Also, if the code shown in FIGURES 2 and 3 is reversed so that decreasing numbers are represented by clockwise movement around the register positions shown in FIGURE 3, the system of FIGURE 1 may be employed for subtraction.

Referring to the magnetic core versions of the ring circuits, shown in FIGURES 9 through 14, it will be understood that these several embodiments are usable in a system of the character shown in FIGURE 1. While no specific ring control unit for operating the magnetic core rings has been shown, it is believed apparent that such a unit might readily be designed following the teaching of FIGURE 6. Except for the fact that the unit of FIGURE 6 depends upon prolonged signals on the several monitor lines 286—293 (not available from the magnetic core rings), it might be employed for this purpose without substantial modification. To use the specific control unit of FIGURE 6 with the rings of FIGURES 9–14 would require inclusion of an auxiliary register, such as a flip-flop, for each of the monitored register positions of the magnetic core add and subtract rings. Such an auxiliary register would be controlled in accordance with the state of the primary core of the associated register position and would provide a constant prolonged signal indicating the state of the associated core. These auxiliary registers would then be connected, in the manner disclosed with reference to the monitored flip-flops of FIGURES 4 and 5, to the several monitor lines.

While the invention has been particularly shown and described with reference to preferred embodiments thereof, it will be understood by those skilled in the art that various changes in form and details may be made therein without departing from the spirit and scope of the invention.

What is claimed is:

1. An electrical system for arithmetically combining first and second digits of a predetermined number system comprising a first stepping register adapted to receive said first digit and operable to be advanced to alter the value of said digit in ordered increments, a second stepping register adapted to receive said second digit and operable to be advanced to alter the value of said second digit in ordered increments, and a control unit, said control unit including means for incrementally advancing said first and second registers in concert in a manner to alter the values of the digits in equal predetermined increments of more than one unit each, said control unit also including means for stopping said incremental advancement of said first and second registers when said second digit reaches a predetermined value and for stopping advancement of said second register and advancing said first register in a manner to increase the value of said first digit in at least one increment of one unit if said second digit reaches a value which differs from said predetermined value by less than said predetermined increment of more than one unit.

2. An electrical system for arithmetically combining first and second digits of a predetermined number system comprising a first stepping register adapted to receive said first digit and operable to be advanced to increase the value of said digit, a second stepping register adapted to receive said second digit and operable to be advanced to decrease the value of said second digit, and a control unit, said control unit including means for incrementally advancing said first and second registers in concert in a manner to increase the value of the first digit in predetermined increments of more than one unit each and to decrease the value of said second digit in increments equal to said predetermined increments, said control unit also including means for stopping said incremental advancement of said first and second registers when said second digit reaches a predetermined value and for stopping advancement of said second register and advancing said first register in a manner to increase the value of said first digit in at least one increment of one unit if said second digit reaches a value which differs from said predetermined value by less than said predetermined increment of more than one unit.

3. An electrical system for arithmetically combining first and second digits of a predetermined number system comprising a first stepping register adapted to receive said first digit and operable to be advanced to increase the value of said digit, a second stepping register adapted to receive said second digit and operable to be advanced to decrease the value of said second digit, and a control unit, said control unit including means for incrementally advancing said first and second registers in concert in a manner to increase the value of the first digit in increments of two units each and to decrease the value of said second digit in increments of two units each, said control unit also including means for stopping said incremental advancement of said first and second registers when said second digit reaches a predetermined value and for stopping advancement of said second register and advancing said first register in a manner to increase the value of said first digit in one increment of one unit of said second digit reaches a value which differs from said predetermined value by one unit.

4. An electrical system for arithmetically combining first and second digits of a predetermined number system comprising a first stepping register adapted to receive said first digit and operable to be advanced to increase the value of said digit, a second stepping register adapted to receive said second digit and operable to be advanced to decrease the value of said second digit, and a control unit, said control unit including means for incrementally advancing said first and second registers in concert in a manner to increase the value of the first digit in equal increments of two units each and to decrease the value of said second digit in equal increments of two units each, said control unit also including means for stopping said incremental advancement of said first and second registers when said second digit reaches a value of zero and for stopping advancement of said second register and advancing said first register in a manner to increase the value of said first digit in one increment of one unit if said second digit reaches a value of one.

5. An electrical system for arithmetically combining two digits of a predetermined number system comprising first and second stepping registers each adapted to receive one of said two digits and each operable to be advanced in a first manner to alter the value of the digit received therein in equal predetermined increments of more than one unit each, at least one of said stepping registers also being operable to be advanced in a second manner to alter the value of the digit received therein in increments of one unit each, control means for advancing said stepping registers in concert in said first manner and for advancing at least one of said registers in said second manner, means for monitoring a selected one of said registers and indicating predetermined conditions thereof, and means associated with said monitor means for causing said control means to cease advancing said register in said first manner when a first predetermined condition is indicated by said monitor means and for causing said control means to cease advancing said registers in said first manner and to advance at least one of said registers in a second manner when a second predetermined condition is indicated.

6. The invention defined in claim 5 wherein said predetermined increments of more than one unit each are equal to two units of said number system.

7. An electrical system for arithmetically combining two digits of a predetermined number system comprising first and second rings each of which comprises a plurality of bistable storage elements, said first and second rings being adapted to represent said first and second digits respectively by combinations of states of their storage elements according to a predetermined code, first electrical circuit means interconnecting the storage elements of said first ring and operable in response to a first control signal to manipulate said first ring to change the combination of states of its storage elements to represent a digit differing two units in value from the digit theretofore represented, second electrical circuit means interconnecting the storage elements of the first ring and operable in response to a second control signal to manipulate said first ring to change the combination of states of its storage elements to represent a digit differing one unit in value from the digit theretofore represented, third electrical circuit means interconnecting the storage elements of the second ring and operable in response to a third control signal to manipulate said second ring to change the combination of states of its storage elements to represent a digit differing two units in value from the digit theretofore represented, and a control unit, said control unit including first means for simultaneously and repetitively producing said first and third signals, said control unit also including second means for producing said second signal, and monitor means responsive to a first predetermined combination of states in said second ring for stopping said first signal producing means and responsive to a second predetermined combination of states in said second ring for stopping said first signal producing means and energizing said second signal producing means.

8. An electrical system for arithmetically combining two digits of a predetermined number system comprising first and second rings each of which comprises a plurality of bistable storage elements, said first and second rings being adapted to represent said first and second digits respectively by combinations of states of their storage elements according to a predetermined code, first electrical circuit means interconnecting the storage elements of said first ring and operable in response to a first control signal to manipulate said first ring to change the combination of states of its storage elements to represent a digit two units greater in value from the digit theretofore represented, second electrical circuit means interconnecting the storage elements of the first ring and operable in response to a second control signal to manipulate said first ring to change the combination of states of its storage elements to represent a digit one unit greater in value from the digit theretofore represented, third electrical circuit means interconnecting the storage elements of the second ring and operable in response to a third control signal to manipulate said second ring to change the combination of states of its storage elements to represent a digit two units smaller in value from the digit theretofore represented, and a control unit, said control unit including means for simultaneously and repetitively producing said first and third signals, said control unit also including means for producing said second signal, and monitor means responsive to a first predetermined combination of states in said second ring for stoping said first signal producing means and responsive to a second predetermined combination of states in said second ring for stopping said first signal producing means and energizing said second signal producing means.

9. A stepping register comprising a plurality of bistable storage elements adapted to be conditioned in different combinations of states to represent the different digits of a number system according to a predetermined code, first transfer means interconnecting said elements and operable in response to a first group of control pulses to condition said elements from a previous combination of states representing a digit directly to a new combination of states representative of a digit of said number system two units different in value from the digit previously represented and second transfer means interconnecting said elements and operable in response to a second group of control pulses to condition said elements in a new combination of states representative of a digit of said number system one unit different in value from the digit initially represented.

10. The invention defined in claim 9 wherein said first and second transfer path means each include a common plurality of secondary storage elements.

11. The invention defined in claim 9 wherein there are five of said storage elements and wherein each digit of said number system is represented by a different two of said elements being in one state and the remaining elements being in the other state.

12. A stepping register comprising a plurality of bistable primary storage elements adapted to be conditioned in different combinations of states to represent the different digits of a number system according to a predetermined code, a plurality of bistable secondary storage elements, first information transfer path means connecting said primary and secondary storage elements operable in response to a first control pulse to cause said secondary storage elements to be conditioned from a previous combination of states representing a digit directly into a combination of states which is associated with a digit of said number system two units different in value from the digit represented by the combination of states of the primary storage elements, and second information transfer path means connecting said primary and secondary storage elements operable in response to a second control pulse to cause said secondary storage elements to be conditioned into a combination of states which is associated with a digit of said number system one unit different in value from the digit represented by the combination of states of the primary storage elements.

13. The invention defined in claim 12 wherein said primary and secondary storage elements comprise bistable magnetic cores and wherein said first and second transfer path means include windings coupled to said cores.

14. The invention defined in claim 12 wherein there are five primary storage elements and five secondary storage elements and wherein each digit of said number system is represented by a different two of said primary storage elements.

15. A closed stepping ring for cyclic operation comprising a plurality of bistable primary storage elements, a bistable secondary storage element corresponding to each primary element, said primary and secondary elements being arranged to form a plurality of register positions functionally arranged in a circle whereby in the stepping direction the last position is succeeded by the first position, first coupling means coupling each primary element to the secondary element of the next succeeding register position and responsive to a first control pulse to condition the secondary element coupled thereto in a given state only if the primary element coupled thereto is in the given state, second coupling means coupling each primary element with its corresponding element and with the primary element of the next succeeding register position and with the secondary element of the second succeeding register position and responsive to a second control pulse to condition the secondary elements coupled thereto in a given state only if both said primary elements coupled thereto are in the given state, third coupling means coupling each primary element with the secondary element of the next succeeding register position and with both the primary element and the secondary element of the second succeeding register position and responsive to said second control pulse to condition the secondary elements coupled thereto in a given state only if both primary elements coupled thereto are in the given state, and fourth coupling means coupled to each secondary element and to the corresponding primary element and responsive to a third control pulse to condition the primary element coupled thereto in a given state only if the secondary element coupled thereto is in the given state.

16. The invention defined in claim 15 wherein there are five primary storage elements and five secondary storage elements arranged to form five register positions.

17. The invention defined in claim 15 wherein each primary element and each secondary element comprises a bistable magnetic core and wherein each said coupling means comprises a series circuit including a winding on each associated primary element and each associated secondary element.

18. The invention defined in claim 15 wherein each of said primary elements and each of said secondary elements comprises an electronic flip-flop circuit adapted to be conditioned into two different stable states by input signals applied to input means of said element, said flip-flop circuit being provided with an output means supplying output signals which are indicative of the binary state into which said flip-flop circuit is conditioned.

19. Apparatus for arithmetically combining two digits of a predetermined number system comprising means for repetitively altering the values of said digits in concert by equal predetermined increments of at least two units of said number system, first monitoring means for monitoring the value of one of said digits and providing an indication if said digit reaches a predetermined value, means responsive to said indication for stopping said altering means, second monitoring means for monitoring the value of said one of said digits and providing an indication if said digit reaches a value which differs from said predetermined value by an amount less than one of said predetermined increments, and means responsive to the indication provided by said second monitoring means for altering the value of the other digit by the amount which the said one of said digits differs from the said predetermined value.

20. The invention defined in claim 19 wherein the predetermined increments of alteration equal two units of said number system, and wherein the amount less than one of said predetermined increments equals one unit of said number system.

References Cited in the file of this patent
UNITED STATES PATENTS

| | | |
|---|---|---|
| 2,654,080 | Browne | Sept. 29, 1953 |
| 2,803,401 | Nelson | Aug. 20, 1957 |
| 2,886,240 | Linsman | May 12, 1959 |